(12) United States Patent  
Kornaros et al.

(10) Patent No.: US 12,494,804 B2  
(45) Date of Patent: Dec. 9, 2025

(54) TRANSCEIVER DEVICE MODEL FOR ESTIMATING LOCATION ATTRIBUTES

(71) Applicant: IOSEA Inc., Aliso Viejo, CA (US)

(72) Inventors: Evangelos Kornaros, Boulder, CO (US); Saman Kabiri, Aliso Viejo, CA (US)

(73) Assignee: IOSEA Inc., Aliso Viejo, CA (US)

( * ) Notice: Subject to any disclaimer, the term of this patent is extended or adjusted under 35 U.S.C. 154(b) by 1211 days.

(21) Appl. No.: 17/350,591

(22) Filed: Jun. 17, 2021

(65) Prior Publication Data

US 2022/0407241 A1  Dec. 22, 2022

(51) Int. Cl.  
*H04B 1/04* (2006.01)

(52) U.S. Cl.  
CPC ....... *H04B 1/04* (2013.01); *H04B 2001/0416* (2013.01)

(58) Field of Classification Search  
CPC ....................................................... H04B 1/04  
See application file for complete search history.

(56) References Cited

U.S. PATENT DOCUMENTS

| | | | |
|---|---|---|---|
| 2013/0005280 A1* | 1/2013 | Leung | G01S 7/023 455/90.1 |
| 2019/0072638 A1* | 3/2019 | Wang | H04W 4/029 |

OTHER PUBLICATIONS

Kabiri, S. et al., "Tightly Coupled Arrays Design Based on Phase Center Contour for Indoor Direction Findings in Harsh Environments," IEEE Transactions on Antennas and Propagation, vol. 68, Iss. 4, Apr. 2020, pp. 2698-2713.  
Kabiri, S., "Novel Methodologies to Mitigate Multipath for Indoor Localization," UC Irvine, Sep. 2019, pp. 1-155.  
Kornaros, E. et al., "A Novel Model for Direction Finding and Phase Center with Practical Considerations," IEEE Transactions on Antennas and Propagation, vol. 65, Iss. 10, Oct. 2017, pp. 5475-5491.

* cited by examiner

*Primary Examiner* — Ayodeji O Ayotunde  
(74) *Attorney, Agent, or Firm* — Fenwick & West LLP

(57) ABSTRACT

A transceiver includes a radiating block that radiates or receives radio frequency (RF) signals and a non-radiating block including non-radiating components that do not radiate RF signals. A device model of the transceiver is generated based on a combination of a model of the radiating block and the non-radiating block. The device model of the transceiver is used to estimate location attributes of other transceivers that transmit incoming RF signals to the modeled transceiver.

6 Claims, 15 Drawing Sheets

TRANSCEIVER DEVICE MODEL FOR ESTIMATING LOCATION ATTRIBUTES

BACKGROUND

1. Field of Art

The disclosure generally relates to localization technology, and more specifically to device models of transceivers that are used to estimate location attributes of other transceivers.

2. Description of the Related Art

Localization technology allows for tracking of objects and locating objects. As a result, localization technology is used in a wide range of applications in various environmental settings. For example, localization technology may be used to track the location of objects in indoor environments or to identify directions within indoor environments. Conventional localization technology currently relies on Global Positioning System (GPS) signals for location tracking. However, GPS signals suffer from inaccuracy in indoor environments due to the obstacles in the indoor environments that contaminate the GPS signals thereby resulting in inaccurate location tracking.

SUMMARY

In one embodiment, a transceiver system includes one or more transceivers. Each transceiver includes a radiating block and a non-radiating block. The radiating block includes an antenna configured to radiate radio frequency (RF) signals in a transmitting mode of the transceiver or receive RF signals in a receiving mode of the transceiver. The non-radiating block includes non-radiating components of the transceiver that do not radiate RF signals.

In one embodiment, the transceiver system may generate a device model of one or more of the transceivers. The device model of a transceiver is generated based on a combination of a model of the radiating block of the transceiver and a model of the non-radiating block of the transceiver. The device model is representative of path of a RF signal through the non-radiating components of the radiating block of the transceiver, one or more first ports of the non-radiating block of the transceiver, one or more second ports of the radiating block of the transceiver, and the antenna. The transceiver system uses the device model to estimate location attributes of another transceiver system that transmits an incoming RF signal to the transceiver system with an improved accuracy over GPS based localization technologies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes only, and may not have been selected to delineate or circumscribe the inventive subject matter.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality.

System Environment According to First Embodiment

Figure 1A:
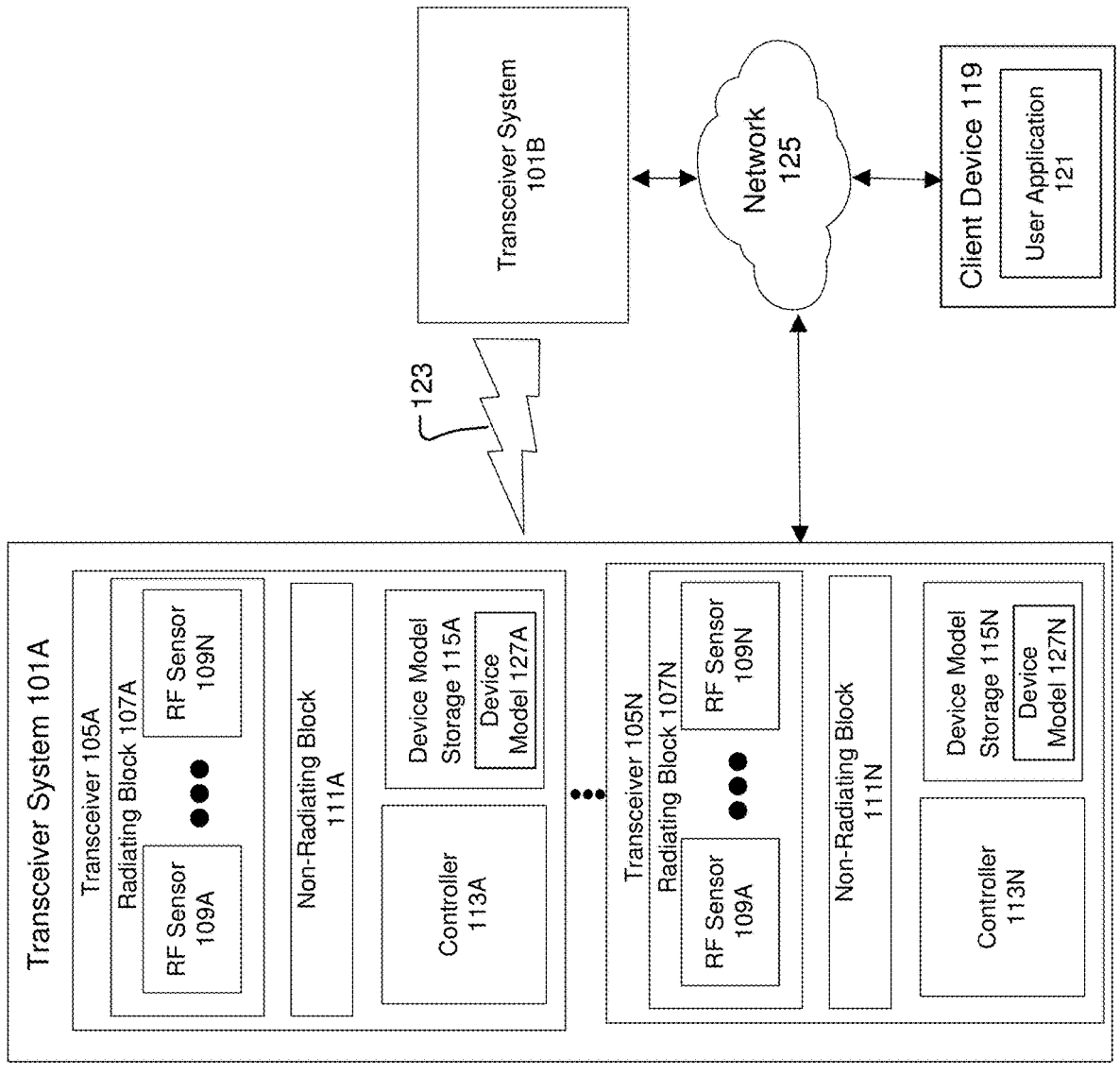
FIG. 1A illustrates a location tracking environment according to a first embodiment.

FIG. 1A is a location tracking environment 100A that includes a transceiver system 101A, a transceiver system 101B, and a client device 119 according to a first embodiment. The location tracking environment 100A may represent an indoor environment, an outdoor environment, or a mix of an indoor and outdoor environment. Each of transceiver system 101A and transceiver system 101B may be configured to operate in either a transmitting mode or a receiving mode. During the transmitting mode of a given transceiver system, the transceiver system is configured to operate as a transmitter and transmits a radio frequency RF signal (e.g., a wireless signal) to another transceiver system that is operating in the receiving mode. During the receiving mode of a given transceiver system, the transceiver system is configured to operate as a receiver and receives an incoming RF signal from another transceiver system that is operating in the transmitting model. Transceiver system 101A and transceiver system 101B may transmit and/or receive RF signals using a wireless communication protocol such as Bluetooth, Wi-Fi, Zigbee, Z-Wave, Long Range (LoRa), Thread, Narrowband-Internet of Things (Nb-IoT), radio-frequency identification (RFID), 3G/4G/5G technologies, Ultra-Wideband (UWB), any proprietary wireless technologies, or other commonly available wireless technology.

In the description herein, transceiver system 101A functions as a receiver since transceiver system 101A is in the receiving mode whereas transceiver system 101B functions as a transmitter since transceiver system 101B is in the transmitting mode and transmits a RF signal 123 to the transceiver system 101A. However, transceiver system 101A may function as a transmitter when configured in the transmitting mode and transceiver receiver 101B may function as a receiver when configured in the receiver mode.

Generally, the transceiver system 101A may estimate location attributes for the transceiver system 101B using one or more device models of the transceiver system 101A that are used to interpret the incoming RF signal from the transceiver system 101B. In one embodiment, the location attributes represent information that may be used to estimate the location of the transceiver system 101B. The estimated location attributes for the transceiver system 101B include the location of the transceiver system 101B with respect to a global coordinate system and an estimated angle (e.g., azimuthal $\varphi$, and elevation $\theta$) of the transceiver system 101B in one embodiment.

The estimated location attributes may also include relative location attributes between the transceiver system 101A and the transceiver system 101B. Examples of the relative location attributes include an estimated distance between the transceiver system 101A and the transceiver system 10B, an estimated angle (e.g., azimuthal $\varphi$, and elevation $\theta$) between the transceiver system 101A and the transceiver system 101B, and an estimated time of travel of the RF signal 123 between the transceiver system 101A and transceiver system 101B.

In one embodiment, a client device 119 is in communication with the transceiver system 101A and the transceiver system 101B via a network 125. The network 125 provides a communication infrastructure between the client device 119 and the transceiver systems 101A, 101B. The network 125 is typically the Internet, but may be any network, including but not limited to a Local Area Network (LAN), a Metropolitan Area Network (MAN), a Wide Area Network (WAN), a mobile wired or wireless network, a private network, or a virtual private network. As shown in FIG. 1A, the client device 119 includes a user application 121 in one embodiment. The user application 121 includes a user interface that displays the estimated location attributes of the transceiver system 101B to a user, for example. The user may be a person that is tracking the location of the transceiver system 101B, for example.

Transceiver Components According to First Embodiment

As shown in FIG. 1A, the transceiver system 101A includes one or more transceivers 105A to 105N where N is an integer greater than 0. Each transceiver 105A to 105N includes its respective radiating block 107, non-radiating block 111, controller 113, and device model storage 115. For example, transceiver 105A includes radiating block 107A, non-radiating block 111A, controller 113A, and device model storage 115A. Similarly, transceiver 105N includes radiating block 107N, non-radiating block 111N, controller 113N, and device model storage 115N. The description of the following components of the transceiver 105A are applicable to the components of transceiver 105N, and thus the description of the components of transceiver 105N are omitted for ease of description.

In one embodiment, the radiating block 107A is configured to radiate one or more RF signals of the transceiver 105A while the transceiver 105A is in the transmitting mode.

In contrast, the radiating block 107A is configured to receive one or more incoming RF signals while the transceiver 105A is in the receiving mode. As shown in FIG. 1A, the radiating block 107A has one or more radiating components that radiate RF signals in the transmitting mode or receive incoming RF signals in the receiving mode. For example, the radiating components are RF sensors 109A to 109N that are each configured to output a RF signal while the transceiver 105A is in the transmitting mode or receive an incoming RF signal while the transceiver 105B is in the receiving mode. In one embodiment, each RF sensor 109A is an antenna and the RF sensors 109A to 109N are arranged in an antenna array.

In one embodiment, the non-radiating block 111A of the transceiver 105A includes non-radiating components of the transceiver 105A that are not configured to radiate a RF signal. The non-radiating components of the non-radiating block 111A include RF switches, ports, transmission lines, and RF components such as a balun, attenuator, RF hybrid couplers, or resistor-inductor-capacitor (RLC) components. Note that the non-radiating block 111A may have other non-radiating components than described herein.

The controller 113A is configured to generate a device model 127A of the transceiver 105A. Generally, the device model 127A is a representation of possible signal paths through the non-radiating components of the non-radiating block 111A, one or more ports of the non-radiating block 111A, one or more ports of the radiating block 107A that are connected to the one or more ports of the non-radiating block 111A, and the RF sensors 109A to 109N of the radiating block 107A. In one embodiment, the controller 113A correlates an incoming RF signal from the transceiver system 101B to estimate location attributes of the transceiver system 101B, as will be further described with respect to FIG. 2.

In one embodiment, the device model of transceiver 105A is a set or a matrix of data entries where each data entry in the matrix is associated with a particular RF path in the transceiver 105A using a particular RF sensor from RF sensors 109A to 109N. Each data entry in the data model describes the RF response of the associated RF path to an incoming RF signal at a given polarization $\theta$ and $\varphi$. The RF response is specified in terms of a magnitude of power and a phase of the power. The matrix includes for each RF path of the transceiver 105A entries for possible combinations of $\theta$ and $\varphi$ of the incoming signal RF used to illicit the RF response in order to model the possible RF responses for the RF path of the transceiver 105A.

As will be further described below, the controller 113A may apply a curve fitting algorithm to the matrix of entries to generate a mathematical equation in terms of $\theta$ and $\varphi$ that is a best fit for the data in the matrix of data entries, in one embodiment. Rather than store the matrix of data entries which requires the transceiver system 101A to have significant storage capacity due to the size of the matrix of data entries, the combining module 211 stores the mathematical equation that represents the matrix of data entries.

The device model storage 115A is configured to store the device model 127A generated by the controller 113A. The device model storage 115A includes memory that stores the device model 127 for the transceiver 105A. As mentioned above, the stored device model 127A may be a matrix of data entries or a mathematical equation that is representative of the data entries in the matrix. In one embodiment, the device model storages 115 are accessible by the user application 121 such that the device models are viewable via the user application 121.

As mentioned above, the description of the above components of the transceiver 105A are applicable to the components of transceiver 105N. However, in the embodiment of FIG. 1A, note that the transceiver 105N includes its own controller 113N that generates the device model 127N of transceiver 105N that is stored in the device model storage 115N. Thus, each transceiver 105A to 105N includes its own dedicated controller 113 for generating the device model of the respective transceiver and its own dedicated device model storage 115 for storing the generated device model 127.

Transceiver system 101B also includes one or more transceivers similar to transceiver 105A to 105N included in transceiver system 101A although not shown in FIG. 1A. Each transceiver included in transceiver system 101B also includes a radiating block having one or more RF sensors, a non-radiating block, a controller, and a device model storage that each performs similar functionality as the like components described with respect to the transceiver system 101A shown in FIG. 1A. Thus, the description for the transceivers of the transceiver system 101B are omitted for ease of readability.

System Environment According to Second Embodiment

Figure 1B:
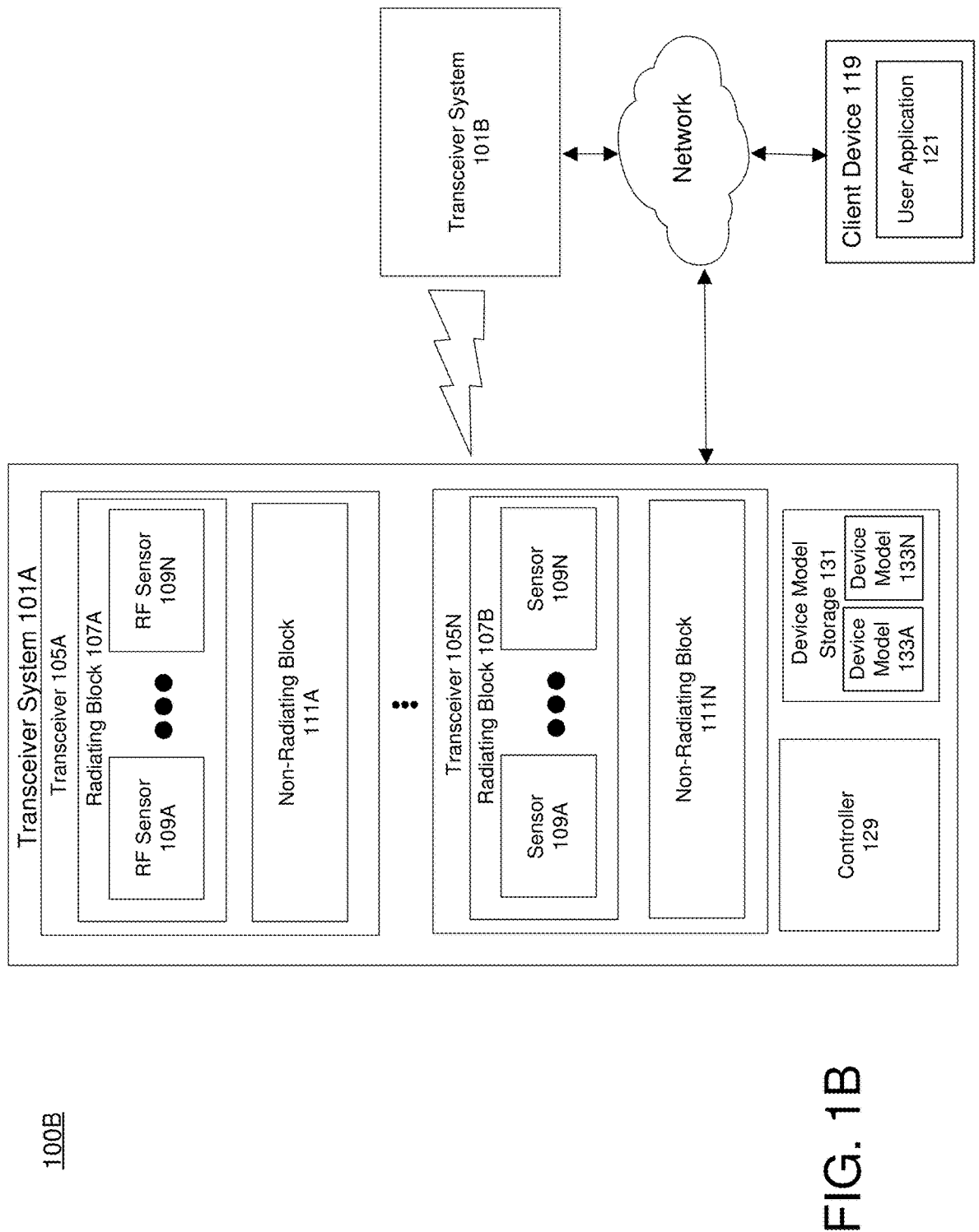
FIG. 1B illustrates a location tracking environment according to a second embodiment.

FIG. 1B is a location tracking environment 100B that includes a transceiver system 101A, a transceiver system 101B, and a client device 119 according to the second embodiment. The second embodiment of the location tracking environment 100B includes similar components as the location tracking environment 100A and the description of the components in FIG. 1A is applicable to FIG. 1B unless specified otherwise.

In contrast to FIG. 1A, the transceiver system 101A in location tracking environment 100B shown in FIG. 1B includes a controller 129 that is shared by the one or more transceivers 105A to 105N in comparison to the transceiver system 101A in location tracking environment 100A in FIG. 1A where each transceiver 105A to 105N has its own dedicated controller 113. In the second embodiment of the location tracking environment 100B, the controller 129 is configured to generate the device model of each of the transceivers 105A to 105N included in the transceiver system 101A. Thus, the controller 129 generates a device model for transceiver 105A and a device model for transceiver 105N for example.

The device model storage 131 stores device models generated by the controller 129. In contrast to the device model storage 115 included in each transceiver in FIG. 1A that stores the device model of its respective transceiver, the device model storage 131 is a common storage that stores the device models of multiple transceivers included in the transceiver system 101A. For example, the device model storage 131 may store the device model 133A for transceiver 105A and device model 133N for transceiver 105N. In one embodiment, the device model storage 131 is accessible by the user application 121 such that the device models are viewable via the user application 121.

In one embodiment, the device model storage 131 that is common to the multiple transceivers in the transceiver system 101A is stored in a storage that is remote from the transceiver system 101A. The transceiver system 101A may fetch device models from the remote device model storage using network 125, for example.

The transceiver system 101B also includes one or more transceivers similar to transceiver 105A to 105N included in transceiver system 101A shown in FIG. 1B. Thus, each transceiver included in transceiver system 101B also includes a radiating block having one or more RF sensors, a non-radiating block, a controller shared by each transceiver, and a shared device model storage that each perform similar functionality as the like components described with respect to the transceiver system 101A in FIG. 1B. Thus, the description for the transceivers of the transceiver system 101B are omitted for ease of readability.

Controller 113/129

Figure 2:
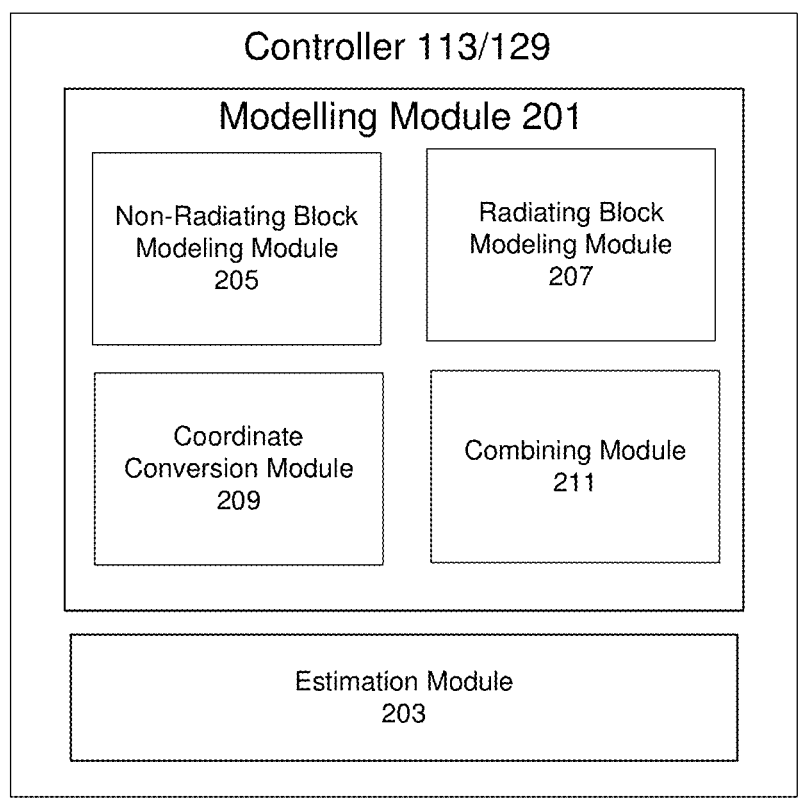
FIG. 2 illustrates a detailed view of a controller according to an embodiment.

FIG. 2 illustrates a detailed view of the controller 113/129 according to one embodiment. The controller 113/129 shown in FIG. 2 is applicable to the first embodiment of the location tracking environment 100A shown in FIG. 1A where each transceiver 105A to 105N has its own dedicated controller 113 as well as the second embodiment of the location tracking environment 100B shown in FIG. 1B where a single controller 129 is shared amongst the transceivers 105A to 105N. As shown in FIG. 2, the controller 113/129 includes a modelling module 201 and an estimation module 203 according to one embodiment. The controller 113/129 may include other modules than those shown in FIG. 2 in other embodiments.

Generally, the modelling module 201 generates the device model of a transceiver 105. The modelling module 201 generates the device model of the transceiver 105 by generating a model of the radiating block 107 of the transceiver 105 and a model of the non-radiating block 111 of the transceiver 105. The modelling module 201 combines the generated models of the radiating block 107 and the non-radiating block 111 to create the device model of the transceiver 105.

In one embodiment, a user may receive the transceiver 105 without a device model of the transceiver 105 being pre-loaded with the transceiver 105. The modelling module 201 may by initiated by the user to generate the device model of the transceiver 105. Alternatively, a user may receive the model of the transceiver 105 from a third-party source that generates the model of the transceiver using another instance of the modelling module 201 located at the third-party source. In another example, the transceiver 105 is pre-configured with the device model 105 by the manufacturer of the transceiver 105.

In one embodiment, the modeling module includes a non-radiating block (NRB) modeling module 205, a radiating block (RB) modeling module 207, a coordinate conversion module 209, and a combining module 211. The modelling module 201 may have additional or fewer modules than shown in FIG. 2 in other embodiments. The described operations of the different modules may be embodied in software, firmware, hardware, or any combinations thereof.

The NRB modeling module 205 generates a model of the non-radiating block 111 of a given transceiver 105 being modeled. In one embodiment, the model of the non-radiating block 111 of a given transceiver is a representation of the non-radiating components included in the non-radiating block 111 of the transceiver 105. In particular, the model of the non-radiating block 111 describes the electrical behavior of non-radiating components of the transceiver 105 when undergoing stimuli by electrical signals such as an incoming RF signal.

In one embodiment, the NRB modeling module 205 generates the model of the non-radiating block 111 of a given transceiver 105 using the scattering parameters (e.g., S-parameters) of the non-radiating components of the transceiver 105. Examples of scattering parameters include gain, return loss, voltage standing wave ratio (VSWR), reflection coefficient and amplifier stability. Each non-radiating component included in the non-radiating block 111 of the transceiver 105 is associated with its own scattering parameters that describe the non-radiating components electrical response characteristics. The scattering parameters of each non-radiating component in the non-radiating block are provided in a technical specification provided by a manufacturer of the non-radiating block 111 of the transceiver 105.

In one embodiment, the NRB modelling module 205 generates the model of the non-radiating block 111 of the transceiver 105 by combining the scattering parameters of the non-radiating components included in the non-radiating block 111 of the transceiver 105 using Mason's Rule (e.g., Mason's gain formula) shown below:

$$G = \frac{y_{out}}{y_{in}} = \frac{\sum_{k=1}^{N} G_k \Delta_k}{\Delta}$$

$$\Delta = 1 - \sum L_i + \sum L_i L_j - \sum L_i L_j L_k + \ldots + (-1)^m \sum \ldots + \ldots$$

In Mason's Rule, $\Delta$ is the determinant of the graph, $y_{in}$ is the input-node variable, $y_{out}$ is the output-node variable, G is the complete gain between $y_{in}$ and $y_{out}$, N is the total number of forward paths between $y_{in}$ and $y_{out}$, $G_k$ is the path gain of the kth forward path between $y_{in}$ and $y_{out}$, $L_i$ is the loop gain of each closed loop in the system, $L_i L_j$ is the product of the loop gains of any two non-touching loops (no common nodes), $L_i L_j L_k$ is the product of the loop gains of any three pairwise non-touching loops, and $\Delta_k$ is the cofactor value of $\Delta$ for the $k^{th}$ forward path, with the loops touching the $k^{th}$ forward path removed. Furthermore, the path describes a continuous set of branches traversed in the direction that they indicate, the forward path describes a path from an input node to an output node in which no node is touched more than once, a loop describes a path that originates and ends on the same node in which no node is touched more than once, the path gain is the product of the gains of all the branches in the path, and the loop gain is the product of the gains of all the branches in the loop.

The RB modeling module 207 generates a model of the radiating block 107 of the transceiver 105 being modeled. In one embodiment, the model of the radiating block 107 of a given transceiver is a representation of the radiating components included in the radiating block 107 of the transceiver 105. In particular, the model of the non-radiating block 111 describes the electrical behavior of radiating components of the transceiver 105 when undergoing stimuli by electrical signals such as the incoming RF signal.

In one embodiment, the RB modeling module 207 generates the model of the radiating block 107 of the transceiver 105 using the scattering parameters (e.g., S-parameters) of the RF sensors 109A to 109N included in the radiating block 107 of the transceiver 105. Examples of scattering parameters of the RF sensors 109 include gain, return loss, voltage standing wave ratio (VSWR), reflection coefficient and amplifier stability. Each of RF sensors 109A to 109N is associated with its own scattering parameters that describe the RF sensor's electrical response characteristics. The scattering parameters of each RF sensor 109 in the radiating block 107 is provided in a technical specification provided by a manufacturer of the RF sensor 109.

In another embodiment, the RB modeling module 207 generates the model of the radiating block 107 of the given transceiver 105 further based on radiation patterns of the RF sensors 109A to 109N of the transceiver 105 in addition to the scattering parameters of the RF sensors 109A to 109N. The radiation pattern of a given RF sensor 109 under test describes the radiation pattern of the RF sensor 109 when all other RF sensors included in the radiating block 107 are terminated by a reference load. In one embodiment, the reference load is 50-Ohm.

The radiation patterns of the RF sensors 109A to 109N included in the radiating block 107 may be determined according to various methodologies including measurement, analytical calculation, and simulation. The resulting radiation patterns of the RF sensors 109A to 109N included in the radiating block 107 of a transceiver 105 are with respect to a local coordinate system (LCS) of the radiating block 107. In one embodiment, the LCS of the radiating block 107 is the Cartesian coordinate system for a three dimensional space defined by the x-axis, y-axis, and z-axis.

In one embodiment, the measurement method for determining the active radiation patterns of the radiating block 107 is performed in an anechoic chamber. During the measurement, a power gain or voltage gain (voltage gain= $\sqrt{powergain}$), phase, and polarization of the radiating block 107 of the transceiver 105 are measured in addition to the active radiation pattern of the radiating block 107. To perform the measurement, a predefined testing system and a test procedure are used.

Figure 3A:
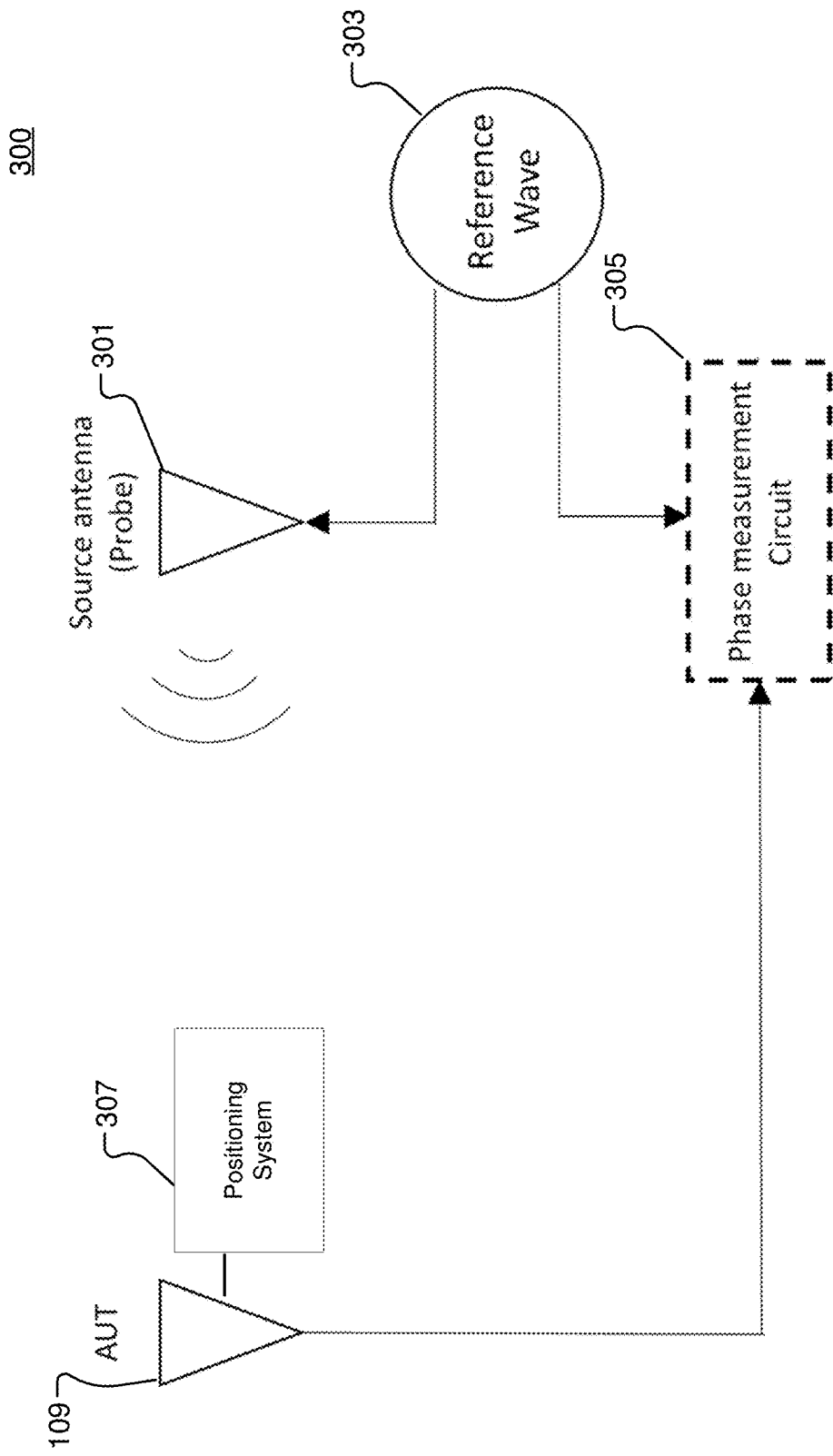
FIGS. 3A to 3E illustrate a testing system for extracting different model parameters of a transceiver under test according to an embodiment.

FIG. 3A illustrates a testing system 300 for measuring the active radiation pattern of a RF sensor 109 included in the radiating block 107 of a transceiver 105 in an anechoic chamber according to one embodiment. The testing system 300 includes the RF sensor 109 of the transceiver 105 being modeled, a reference antenna 301, a RF power transmitter 303, a measurement circuit 305, and a positioning system 307 in one embodiment. The testing system 300 may include other testing components in other embodiments. The RF sensor 109 under testing is considered the antenna under test (AUT) in one embodiment. Note that all other RF sensors 109 included in the radiating block 107 are terminated by a reference load (e.g., 50-Ohm) so that only a single RF sensor 109 is tested.

The reference antenna 301 is an antenna that has known RF characteristics such as a known gain, radiation pattern, etc. In one embodiment, the reference antenna 301 is separated from the RF sensor 109 by a threshold distance R which is defined by the larger of the reference antenna 301 and the RF sensor 109. In one embodiment, R is defined as follows:

$$R > \frac{2D^2}{\lambda}$$

where D is the largest dimension of the largest antenna (reference antenna 301 or RF sensor 109) and $\lambda$ is the wavelength of the lowest operating frequency of a test signal.

In one embodiment, the RF power transmitter 303 is a circuit that generates the test signal (e.g., a reference wave) that is output by the reference antenna 301 to the RF sensor 109. The RF power transmitter 303 generates the test signal having a known power level and an output frequency that is configurable (e.g., selectable).

In one embodiment, the measurement circuit 305 determines the amount of power that is received by the RF sensor 109. The measurement circuit 305 may include a power meter that measures RF power and is directly connected to terminals of the RF sensor 109 via a transmission line such as a coaxial cable with N-type or SubMiniature version A (SMA) connectors, for example.

In one embodiment, the positioning system 307 is a mechanism configured to rotate the radiating block 107 that includes the RF sensor 109 relative to the reference antenna 301 to measure the radiation pattern of the RF sensor 109 as a function of angle. The positioning system 307 controls the orientation of the radiating block 107 to define the local coordinate system of the radiating block 107. The positioning system 307 rotates the radiating block 107 so that the test signal is received by the RF sensor 109 at a plurality of different angles since the goal of the measurement is to measure the radiation pattern of the radiating block 107 as a function of angle. In one embodiment, the radiation pattern is measured as a function of angle in the spherical coordinate system.

The granularity of step sizes between the different angles of rotation performed by the positioning system 307 is configurable and defines the angular resolution of the model of the radiating block 107. In one embodiment, the reference antenna 301 may be connected to positioning system 307 to rotate the reference antenna 301 instead of the RF sensor 109 being rotated by positioning system 307 or both the reference antenna 301 and the RF sensor 109 are rotated by their respective positioning system.

In one embodiment, the radiation pattern of the RF sensor 109 is specified in terms of the magnitude of the power received or transmitted by the radiating block and the phase of the power. To determine the power and phase of the radiating block 107, measurements are conducted in in two orthogonal directions of theta hat $\hat{\theta}$ (unit vector in $\theta$ direction) and phi hat $\hat{\varphi}$ (unit vector in $\varphi$ direction) in the spherical coordinate system to determine the polarizations of the RF sensor 109 in terms of theta $\theta$ and phi $\varphi$.

Generally, the model of the RF sensor 109 in $\hat{\theta}$ (unit vector in the $\theta$ polarization of the spherical coordinate system) is defined by the following equation E1:

$$a_\theta'^{(i)}(\theta',\varphi',f) = g_\theta'^{(i)}(\theta',\varphi',f) e^{j\psi_\theta'^{(i)}(\theta',\varphi',f)} \quad \text{(E1)}$$

where $a_\theta'^{(i)}(\theta', \varphi', f)$ is the array response of the given RF sensor i included in the radiating block 107 in the $\theta$ polarization, $g_\theta'^{(i)}(\theta', \varphi', f)$ is the gain or radiation magnitude response of the given RF sensor i in the $\theta$ polarization, $\theta'$ and $\varphi'$ describe the polarization of the reference antenna 301 in the local coordinate system, and $e^{j\psi_\theta'^{(i)}(\theta', \varphi', f)}$ are complex components of the radiation phase response of the given RF sensor i in the $\theta$ polarization, and f is the frequency of the test signal. In the equation E1, the gain $g_\theta'^{(i)}(\theta', \varphi', f)$ and the radiation phase response $\psi_\theta'^{(i)}(\theta', \varphi', f)$ are unknown. Note that in equation E1, all parameters are denoted as primed "'" which refers to the local coordinate system of the RF sensor 109 under test.

The following description with respect to FIGS. 3B to 3E describes one embodiment of a testing procedure used to determine the gain $g_\theta'^{(i)}(\theta', \varphi', f)$ and the radiation phase response $\psi_\theta'^{(i)}(\theta', \varphi', f)$ for the RF sensor i in equation E1. Other steps may be performed in the testing procedure to determine the gain $g_\theta'^{(i)}(\theta', \varphi', f)$ and the radiation phase response $\psi_\theta'^{(i)}(\theta', \varphi', f)$ in equation E1 in other embodiments.

Figure 3B:
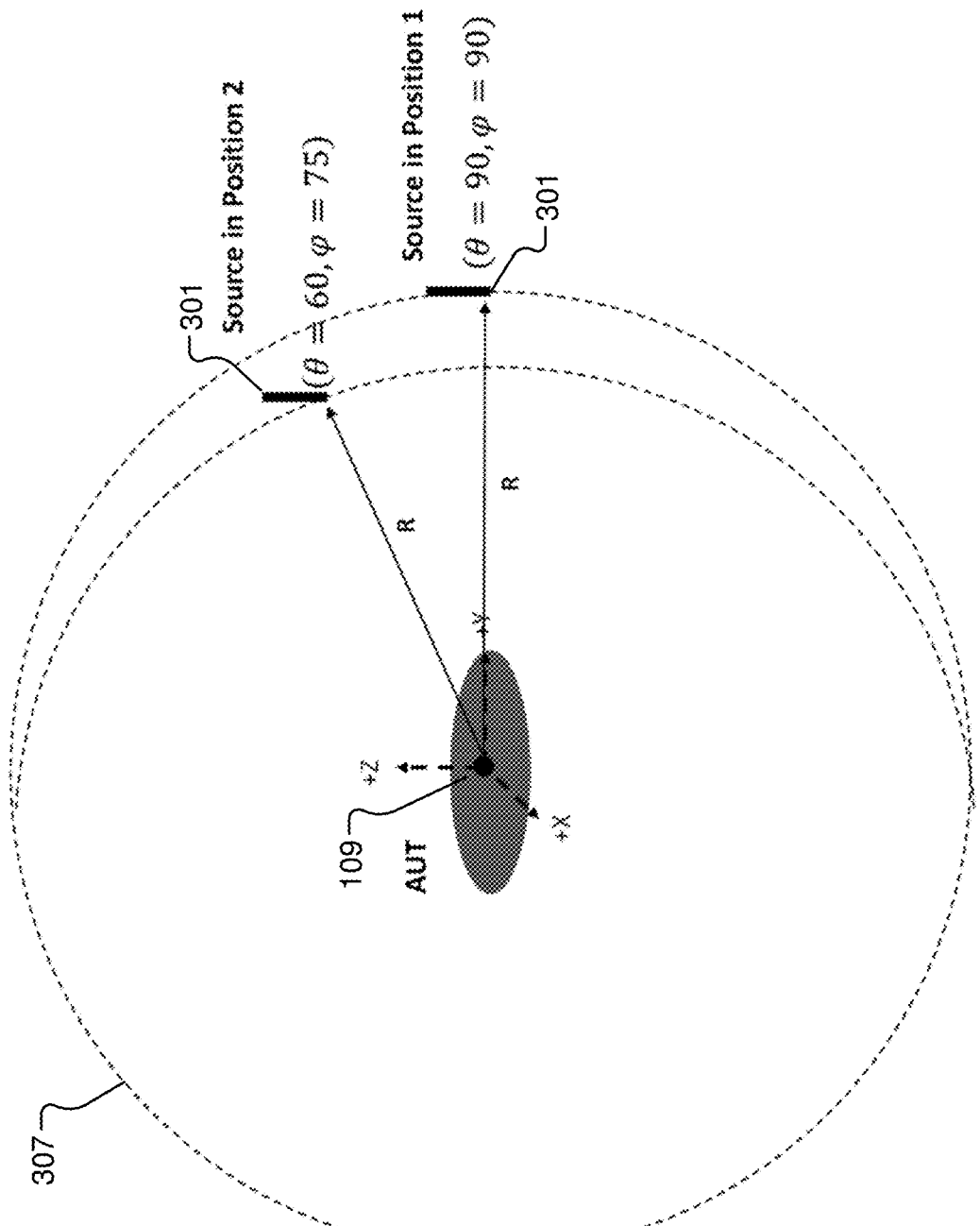

Referring to FIG. 3B, an arrangement of the RF sensor 109 under test and the reference antenna 301 are shown according to one embodiment. As shown in FIG. 3B, in Step 1 of the testing procedure, the radiating block 107 is first placed at the origin of a sphere 307. In Step 2 of the testing procedure, the reference antenna 301 is then placed at position 1 in the direction of $\hat{\theta}$ (unit vector in $\theta$ direction) as shown in FIG. 3B. In one embodiment, position 1 is in the spherical coordinate system where $\theta=90$ and $\varphi=90$ where R is a constant radius that separates the reference antenna 301 from the RF sensor 109 as previously described above.

Figure 3C:
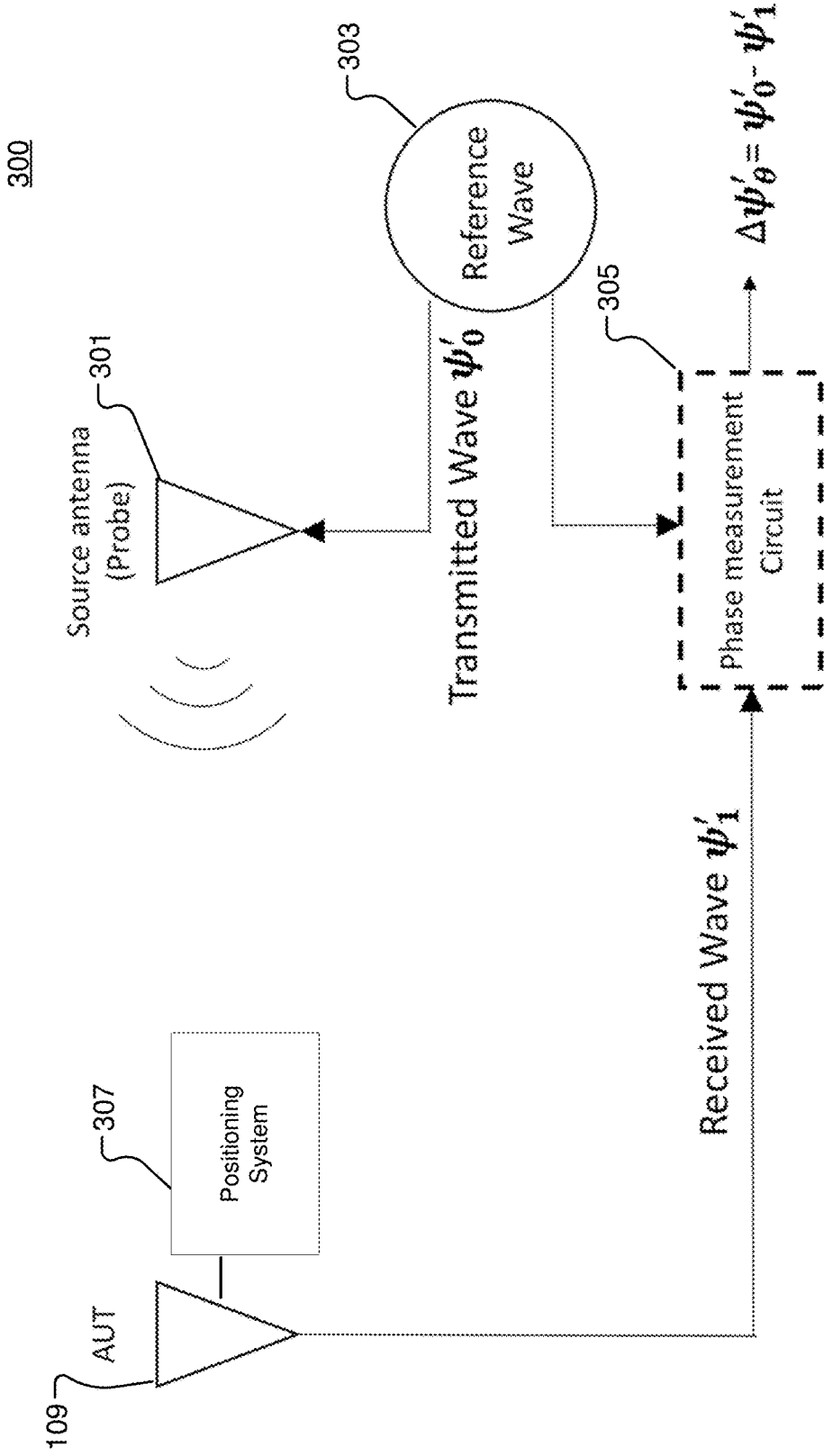

Referring to FIG. 3C, in Step 3 of the testing procedure, while the reference antenna 301 is at position 1, the reference antenna 301 is configured in the transmitting mode and the RF power transmitter 303 generates a test signal (e.g., a reference wave) $\psi_0'$ that is transmitted by the reference antenna 301 to the RF sensor 109 under test. The RF sensor 109 outputs to the measurement circuit 305 test signal $\psi_1'$ in response to receiving test signal $\psi_0'$. Generally, the test signal $\psi_0'$ transmitted by the reference antenna 301 is different from the test signal $\psi_1'$ output by the RF sensor 109. The measurement circuit 305 receives both the test signal $\psi_1'$ from the RF sensor 109 and the transmitted test signal $\psi_0'$ generated by the RF power transmitter 303 and measures the phase difference between the test signals which is represented as $\Delta\psi_\theta'^{(1)}(90, 90, f)$ where $\theta=90$ and $\varphi=90$ and f is the frequency of the test signal $\psi_0'$.

Figure 3D:
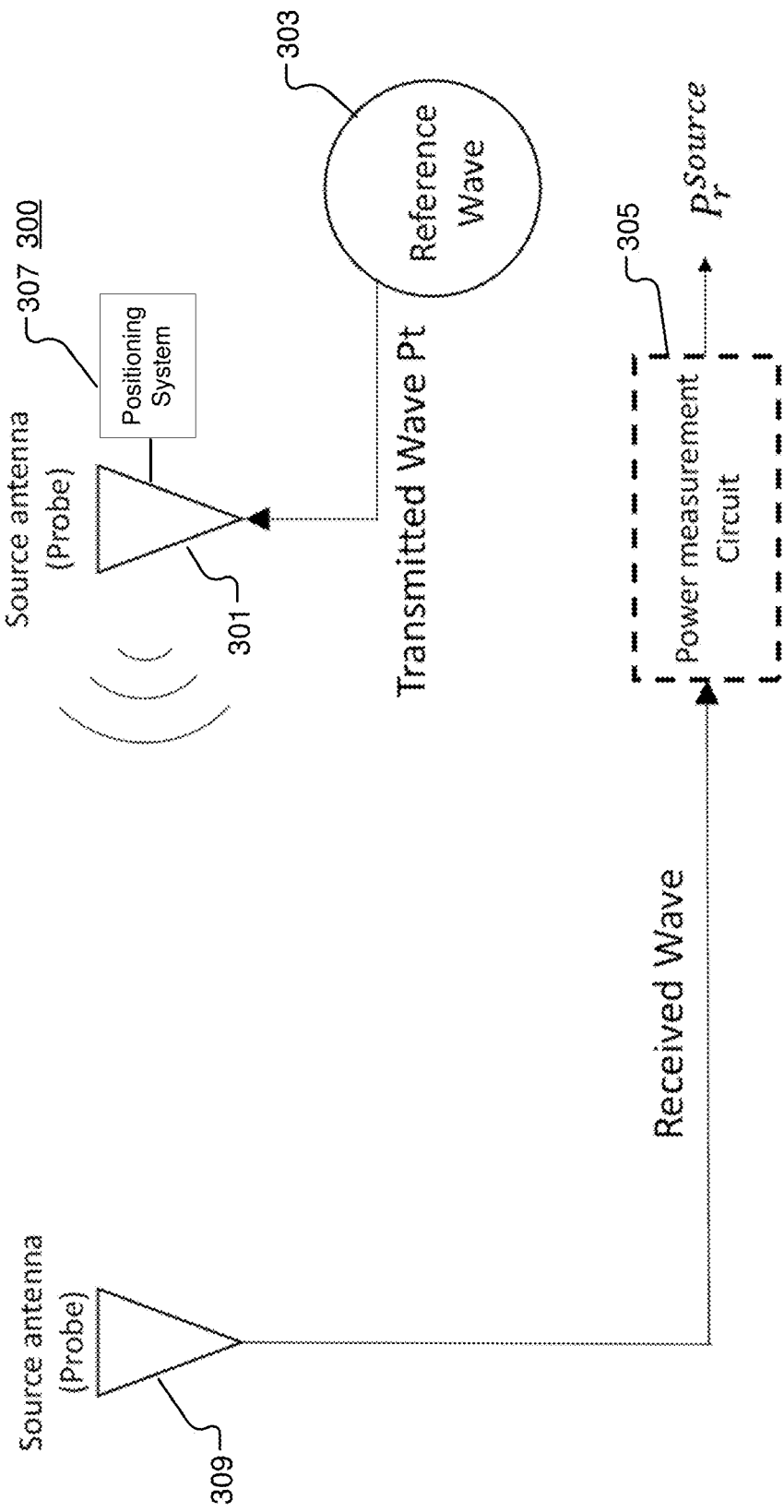

Referring to FIG. 3D, in Step 4 of the testing procedure, another reference antenna 309 replaces the RF sensor 109 and is switched to the receiving mode while the reference antenna 301 is still at position 1. In one embodiment, the reference antenna 301 and the other reference antenna 309 are identical antennas so they have the same properties. The RF power transmitter 303 is connected to the reference antenna 301 and the reference antenna 301 transmits a wave Pt with a known power level to the other reference antenna 309. The other reference antenna 309 outputs the received wave to the measurement circuit 305. The measurement circuit 305 measures the received power $P_r^{Source}$ of the wave outputted by the other reference antenna 301 to the measurement circuit 305. Since the other reference antenna 309 and the reference antenna 301 are identical, the received power $P_r^{Source}$ of the wave outputted by the other reference antenna 301 is the same for the reference antenna 309.

Figure 3E:
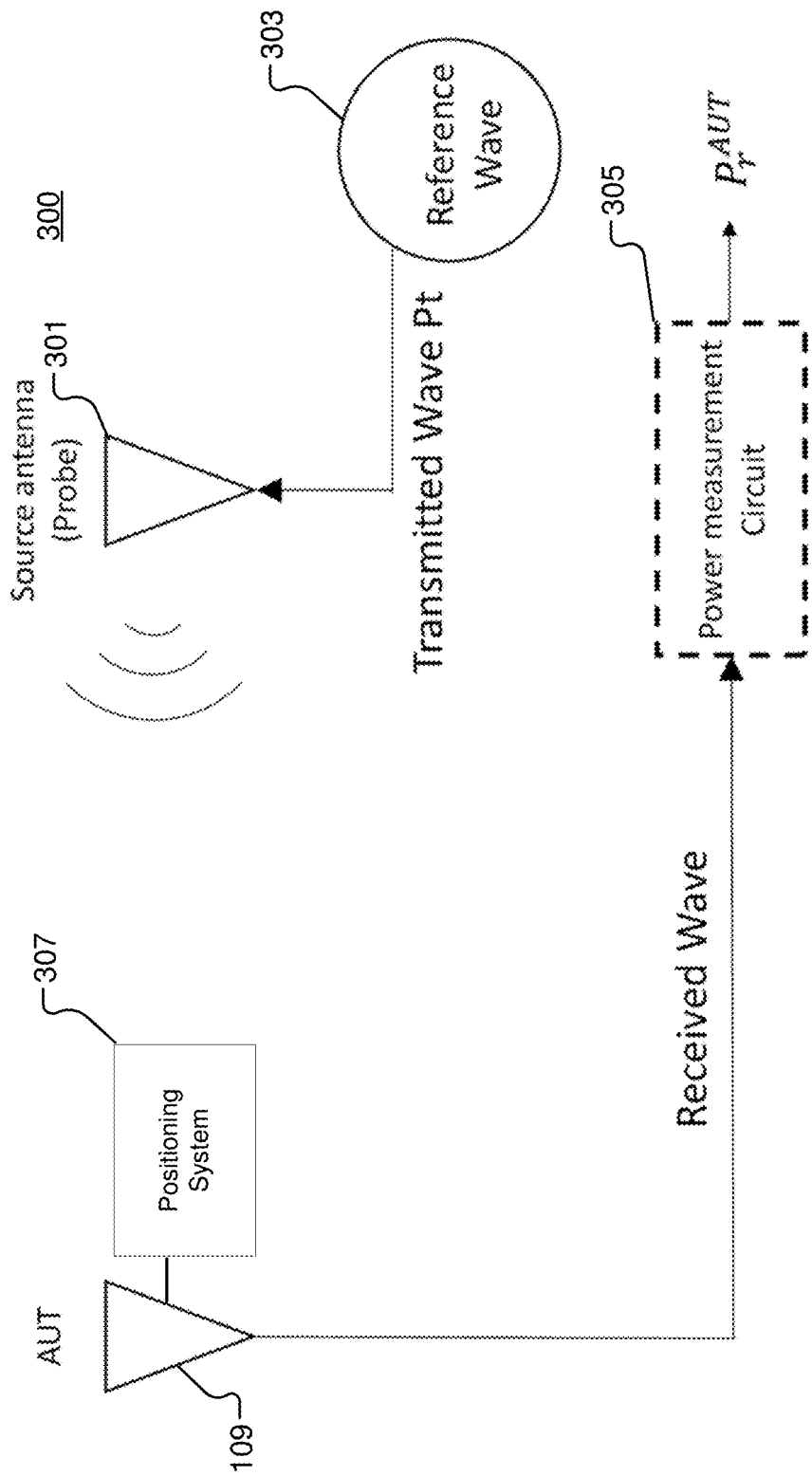

Referring to FIG. 3E, in Step 4 of the testing procedure, the RF sensor 109 replaces the other reference antenna 309 and is switched to the receiving mode. The RF power transmitter 303 is connected to the reference antenna 301 and the reference antenna 301 transmits a wave Pt with a known power level to the RF sensor 109. The RF sensor 109 outputs the received wave to the measurement circuit 305. The measurement circuit 305 measures the received power $P_r^{AUT}$ of the wave outputted by the RF sensor 109 to the measurement circuit 305.

Since the gain of the reference antenna 301 is known, the radiating block modeling module 207 can calculate the voltage gain response $g_\theta'^{(i)}(\theta'=90, \varphi'=90, f)$ of the RF sensor 109. In one embodiment, the radiating block modeling module 207 calculates the voltage gain response $g_\theta'^{(i)}(\theta'=90, \varphi'=90, f)$ of the RF sensor 109 according to equation E2 as follows:

$$g_\theta'^{(i)}(\theta' = 90, \varphi' = 90, f) = \sqrt{\frac{P_r^{AUT}}{P_r^{Source}} G_r^{Source}} \quad \text{(E2)}$$

where $P_r^{AUT}$ is the power of the wave outputted by the radiating block 107, $P_r^{Source}$ is the power of the wave outputted by the reference antenna 301, and $G_r^{Source}$ is the gain response of the reference antenna 301.

Similar to equation E1, the device model of the RF sensor 109 in $\hat{\varphi}$ (unit vector in $\varphi$ direction of the spherical coordinate system) is defined by the following equation E3:

$$a_\varphi'^{(i)}(\theta', \varphi',f) e^{j\psi_\varphi'^{(i)}(\theta',\varphi',f)} \quad \text{(E3)}$$

where $a_\varphi'^{(i)}(\theta', \varphi', f)$ is the array response of the RF sensor i under test in $\hat{\varphi}$, $g_\varphi'^{(i)}(\theta', \varphi', f)$ is the voltage gain response of the given RF sensor i in $\hat{\varphi}$, $\theta'$ and $\varphi'$ describe the polarization of the reference antenna 301 in the local coordinate system, and $e^{j\psi_\varphi'^{(i)}(\theta', \varphi', f)}$ are complex components of the phase response of the given RF sensor i in $\hat{\varphi}$, and f is the frequency of the test signal. In equation E3, the voltage gain response $g_\varphi'^{(i)}(\theta', \varphi', f)$ and the complex phase component $\psi_\varphi'^{(i)}(\theta', \varphi', f)$ are unknown. Note that in equation E3, all parameters are denoted as primed "'" which refers to the local coordinate system of the RF sensor 109 under test.

Referring back to FIG. 3B, in Step 5 of the testing procedure, Steps 2 through 4 described above are repeated to obtain $g_\varphi'^{(i)}(\theta'=90, \varphi'=90, f)$ and $\Delta\psi_\varphi'^{(i)}(\theta'=90, \varphi'=90, f)$. As shown in FIG. 3B, the radiating block 107 is again placed at the origin of a sphere 307. Step 2 of the testing procedure described above is repeated for $\hat{\varphi}$ (unit vector in $\varphi$ direction by first placing the reference antenna 301 at position 1. As described above, position 1 is in the spherical coordinate system where $\theta=90$ and $\varphi=90$ where R is a constant radius that separates the reference antenna 301 from the RF sensor 109.

Referring to FIG. 3C, Step 3 of the testing procedure is repeated for $\hat{\varphi}$, where the reference antenna 301 is configured in the transmitting mode at position 1 and the RF power transmitter 303 generates a test signal (e.g., a reference wave) $\psi_0'$ that is transmitted by the reference antenna 301 to the RF sensor 109. The RF sensor 109 outputs the received test signal $\psi_1'$ to the measurement circuit 305. Generally, the test signal $\psi_0'$ transmitted by the reference antenna 301 is different from the test signal $\psi_1'$ output by the radiating block 107. The measurement circuit 305 receives both the received test signal $\psi_1'$ from the radiating block 107 and the transmitted test signal $\psi_0'$ generated by the RF power transmitter 303 and measures the phase difference between the test signals which is represented as $\Delta\psi_\varphi'^{(1)}(90, 90, f)$ where $\theta=90$ and $\varphi=90$ and f is the frequency of the test signal $\psi_0'$.

Referring to FIG. 3D, Step 4 of the testing procedure is repeated for by switching the reference antenna 301 from the transmitting mode to the receiving mode while the reference antenna is still at position 1 and the RF sensor 109 is switched from the receiving mode to the transmitting mode. The RF power transmitter 303 is connected to the RF sensor 109 and the RF sensor 109 transmits a wave Pt with a known power level to the reference antenna 301. The reference antenna 301 outputs the received wave to the measurement circuit 305. The measurement circuit 305 measures the received power $P_r^{Source}$ of the wave outputted by the reference antenna 301 to the RF power transmitter 305.

Referring to FIG. 3E, in Step 4 of the testing procedure the reference antenna 301 is then switched from the receiving mode back to the transmitting mode while the reference antenna is still at position 1 and the RF sensor 109 is switched from the transmitting mode back to the receiving mode. The RF power transmitter 303 is connected to the reference antenna 301 and the reference antenna 301 transmits a wave Pt with a known power level to the RF sensor 109. The RF sensor 109 outputs the received wave to the measurement circuit 305. The measurement circuit 305 measures the received power $P_r^{AUT}$ of the wave outputted by the RF sensor 109 to the measurement circuit 305.

Since the gain of the reference antenna 301 is known, the radiating block modeling module 207 can calculate the voltage gain response $g_\varphi'^{(i)}(\theta'=90, \varphi'=90, f)$ of the RF sensor 109. In one embodiment, the radiating block modeling module 207 calculates the voltage gain response $g_\varphi'^{(i)}(\theta'=90, \varphi'=90, f)$ of the RF sensor 109 according to equation E4 as follows:

$$g_\varphi'^{(i)}(\theta'=90, \varphi'=90, f) = \sqrt{\frac{P_r^{AUT}}{P_r^{Source}} G_r^{Source}} \quad (E4)$$

where $P_r^{AUT}$ is the power of the wave outputted by the radiating block 107, $P_r^{Source}$ is the power of the wave outputted by the reference antenna 301, and $G_r^{Source}$ is the gain response of the reference antenna 301.

In Step 6 of the testing procedure, Steps 2 through 5 described above are repeated for a plurality of points in the spherical coordinate system in both the $\theta$ and $\varphi$ directions at the radius R. For example, at position 1 the radiating block 107, the reference antenna 301, or both the radiating block 107 and the reference antenna 301 are rotated at different angles in the $\theta$ and $\varphi$ directions. Based on the resulting measurements described above with respect to Steps 2 through 5 for each angle in the $\theta$ and $\varphi$ directions, the radiating block modeling module 207 calculates the voltage gain response $g_\theta'^{(i)}(\theta', \varphi', f)$ and voltage gain response $g_\varphi'^{(i)}(\theta', \varphi', f)$ for the particular polarizations $\theta'$ and $\varphi'$.

In one embodiment, one of the measurements in Steps 2 through 5 is used as a reference measurement in order calculate the phase of the absolute radiation pattern. For example, the measured phase difference $\Delta\psi_\theta'^{(1)}(90, 90, f)$ is used as a reference measurement. The radiating block modelling module 207 calculates a difference between the reference measurement and all other measured phase differences $\Delta\psi_\theta'^{(1)}$ and $\Delta\psi_\varphi'^{(1)}$ at the different polarizations $\theta'$ and $\varphi'$ resulting from the RF sensor 109, the reference antenna 301, or both the RF sensor 109 and the reference antenna 301 being rotated at different angles in the $\theta$ and $\varphi$ directions. As a result of the calculations, the radiating block modelling module 207 generates the phase response $\psi_\theta'^{(1)}(\theta', \varphi', f)$ in the $\theta$ direction and the phase response $\psi_\varphi'^{(1)}(\theta', \varphi', f)$ in the $\varphi$ direction for a plurality of angles of $\theta$ and $\varphi$. Thus, the radiating block modeling module 207 has determined the voltage gain response $g_\theta'^{(1)}(\theta', \varphi', f)$, the voltage gain response $g_\varphi'^{(1)}(\theta', \varphi', f)$, the phase response $\psi_\theta'^{(1)}(\theta', \varphi', f)$, and the phase response $\psi_\varphi'^{(1)}(\theta', \varphi', f)$ for a single RF sensor 109.

In one embodiment, Steps 1 through 6 described above are repeated for each RF sensor 109 included in the radiating block 107 of the transceiver 105 that is being modeled. Once all of the RF sensors 109 included in the radiating block 107 is tested according to the testing procedure described above, the array response $a_\theta'^{(i)}(\theta', \varphi', f)$ in the $\theta$ polarization and the array response $a_\varphi'^{(i)}(\theta', \varphi', f)$ in the $\varphi$ polarization are obtained for all of the different RF paths of the radiating block 107.

As mentioned above, the radiation patterns of the RF sensors 109A to 109N included in the radiating block 107 may also be determined using analytical and simulation methodologies. Briefly, the analytical method is used if the RF sensors 109A to 109N are conventional antenna elements where the radiation patterns can be obtained in form of explicit expressions like Dipoles, Monopoles, etc. The simulation methodology uses finite element method (FEM) simulation or methods of moments (MOM) simulations to perform the testing procedure described above in a virtual simulation environment of the testing system 300.

In one embodiment, the active radiation pattern of an i-th RF sensor 109A to 109N in the local coordinate system is represented by equation E5 shown below.

$$\begin{cases} a_\theta^{(i)}(\theta', \varphi', f) = g_\theta'^{(i)}(\theta', \varphi', f)e^{j\psi_\theta'^{(i)}(\theta',\varphi',f)} \\ a_\varphi^{(i)}(\theta', \varphi', f) = g_\varphi'^{(i)}(\theta', \varphi', f)e^{j\psi_\varphi'^{(i)}(\theta',\varphi',f)} \end{cases} \quad (E5)$$

where $g'^{(i)}_\theta(\theta', \varphi', f)$, $\psi'^{(i)}_\theta(\theta', \varphi', f)$, $g'^{(i)}_\varphi(\theta', \varphi', f)$, $\psi'^{(i)}_\varphi(\theta', \varphi', f)$ are four independent parameters which describes the radiation properties of the i-th RF sensor 109 of the radiating block 107 where a frequency component is denoted by f. As mentioned previously, $g'^{(i)}_\theta(\theta', \varphi', f)$ is the gain or radiation magnitude response in the θ' polarization and local coordinate system and $g'^{(i)}_\varphi(\theta', \varphi', f)$ is the gain or radiation magnitude response in the φ' polarization and local coordinate system. Furthermore, $\psi'^{(i)}_\theta(\theta', \varphi', f)$ is the radiation phase response in the θ' polarization and the local coordinate system and $\psi'^{(i)}_\varphi(\theta', \varphi', f)$ is the radiation phase response in the φ' polarization and the local coordinate system.

Referring back to FIG. 2, the coordinate conversion module 209 converts the active radiation pattern of the RF sensors 109A to 109N (e.g., equation E5) that are in the local coordinate system to a global coordinate system. In one embodiment, the global coordinate system is the Earth-centered inertial (ECI) frame which is a global reference frame that has its origin at the center of the Earth. However, other global coordinate systems may be used such as a geocentric coordinate system where each point in space is specified by their latitude and longitude and the directions towards North, South, West and East.

In one embodiment, the coordinate conversion module 209 uses a 9-axis inertial measurement system (IMU) to define the global coordinate system. The IMU may include 3-axis accelerometers, 3-axis gyroscopes, and 3-axis magnetometers to provide the global coordinate system origin, for example.

Once the origin of the global coordinate system is defined, the coordinate conversion module 209 uses a total rotation matrix R shown in equation E6 shown below to convert the active radiation pattern of the RF sensors 109A to 109N (e.g., equation E5) that are in the local coordinate system to the global coordinate system.

$$R = R_z(\alpha)R_y(\beta)R_x(\gamma) = \begin{pmatrix} \cos(\alpha) & -\sin(\alpha) & 0 \\ \sin(\alpha) & \cos(\alpha) & 0 \\ 0 & 0 & 1 \end{pmatrix}\begin{pmatrix} \cos(\beta) & 0 & \sin(\beta) \\ 0 & 1 & 0 \\ -\sin(\beta) & 0 & \cos(\beta) \end{pmatrix}\begin{pmatrix} 1 & 0 & 0 \\ 0 & \cos(\gamma) & -\sin(\gamma) \\ 0 & \sin(\gamma) & \cos(\gamma) \end{pmatrix} \quad (E6)$$

The total rotation matrix R is a transformation matrix that is used to perform a rotation on the spherical coordinate components of the active radiation pattern of the RF sensors 109A to 109N that are in the local coordinate system to the global coordinate system. In the total rotation matrix R, the x-axis is represented by γ, the y-axis is represented by β, and the z-axis is represented by α.

The coordinate conversion module 209 rotates the spherical coordinate components (θ', φ') of the active radiation pattern of the RF sensors 109A to 109N that are in the local coordinate system to (θ, φ) in the global coordinate system by solving for (θ, φ) using equation E7 and equation E8 shown below.

$$\begin{pmatrix} \sin\theta\cos\varphi \\ \sin\theta\sin\varphi \\ \cos\theta \end{pmatrix} = R\begin{pmatrix} \sin\theta'\cos\varphi' \\ \sin\theta'\sin\varphi' \\ \cos\theta' \end{pmatrix} \quad (E7)$$

$$\begin{pmatrix} 0 \\ a_\theta^{(i)}(\theta, \varphi, f) \\ a_\varphi^{(i)}(\theta, \varphi, f) \end{pmatrix} = A_c^s R A_s^c \begin{pmatrix} 0 \\ a_\theta'^{(i)}(\theta', \varphi', f) \\ a_\varphi'^{(i)}(\theta', \varphi', f) \end{pmatrix} \quad (E8)$$

In equation E8, the array responses $a_\theta^{(i)}(\theta, \varphi, f)$, $a_\varphi^{(i)}(\theta, \varphi, f)$ are the θ and φ components of device model in global coordinate system at (θ, φ) derived from equation E7. $A_c^s$ is the Cartesian to Spherical Coordinate System Conversion Matrix and $A_s^c$ is the Spherical to Cartesian Coordinate System Conversion Matrix. In one embodiment, $A_c^s$ is represented by equation E9 and $A_s^c$ is represented by equation E10 shown below.

$$A_c^s = \begin{pmatrix} \sin\theta\cos\varphi & \sin\theta\sin\varphi & \cos\theta \\ \cos\theta\cos\varphi & \cos\theta\sin\varphi & -\sin\theta \\ -\sin\varphi & \cos\varphi & 0 \end{pmatrix} \quad (E9)$$

$$A_s^c = \begin{pmatrix} \sin\theta'\cos\varphi' & \cos\theta'\cos\varphi' & -\sin\varphi' \\ \sin\theta'\sin\varphi' & \cos\theta'\sin\varphi' & \cos\varphi' \\ \cos\theta' & -\sin\theta' & 0 \end{pmatrix} \quad (E10)$$

Using equations E8, E9, and E10, the coordinate conversion module 209 converts the array response $a_\theta'^{(i)}(\theta', \varphi', f)$ and array response $a_\varphi'^{(i)}(\theta', \varphi', f)$ of the radiating block 107 that are in the local coordinate system to the global coordinate system. Thus, the device model of the radiating block 107 includes the array responses $a_\theta^{(i)}(\theta, \varphi, f)$, $a_\varphi^{(i)}(\theta, \varphi, f)$ of all of the RF sensors 109A to 109N of the radiating block 107 that are in the global coordinate system and the scattering parameters of the RF sensors 109A to 109N of the radiating block 107.

Referring back to FIG. 2, the combining module 211 combines the device model of the non-radiating block 111 and the device model of the radiating block 107 of the transceiver 105 that is being modeled, together with consideration of the connection structure between the radiating block 107 and the non-radiating block 111, to generate the device model of the transceiver 105. The device model of the transceiver 105 is also dependent on the connection structure between the radiating block 107 and the non-radiating block 111 as the connection structure impacts the signal path through the transceiver 105.

In one embodiment, the non-radiating block 111 includes a plurality of first ports and the radiating block 107 includes a plurality of second ports. Each of the plurality of second ports of the radiating block 107 is connected to a corresponding one of the plurality of RF sensors 109A to 109N. The second ports of the radiating block 107 are also connected to the first ports of the non-radiating block 111 to connect together the radiating block 107 and the non-radiating block. Thus, unlike under the testing procedure where a RF sensor 109 that is not undergoing test is connected to a reference load (e.g., 50-Ohm), each second port of the radiating block 107 is connected to a corresponding first port of the non-radiating block 111.

The first ports of the non-radiating block 111 and the second ports of the radiating block 107 may be connected in different connection arrangements where each connection arrangement provides a different pathway for a RF signal. Each possible pathway in the transceiver 107 may have a different response characteristic to an incoming RF signal.

Thus, the final device model of the transceiver 105 is dependent on the connection structure of the ports of the non-radiating block 111 and the radiating block 107 in addition to the device models of the radiating block 107 and the non-radiating block 111.

Figure 4A:
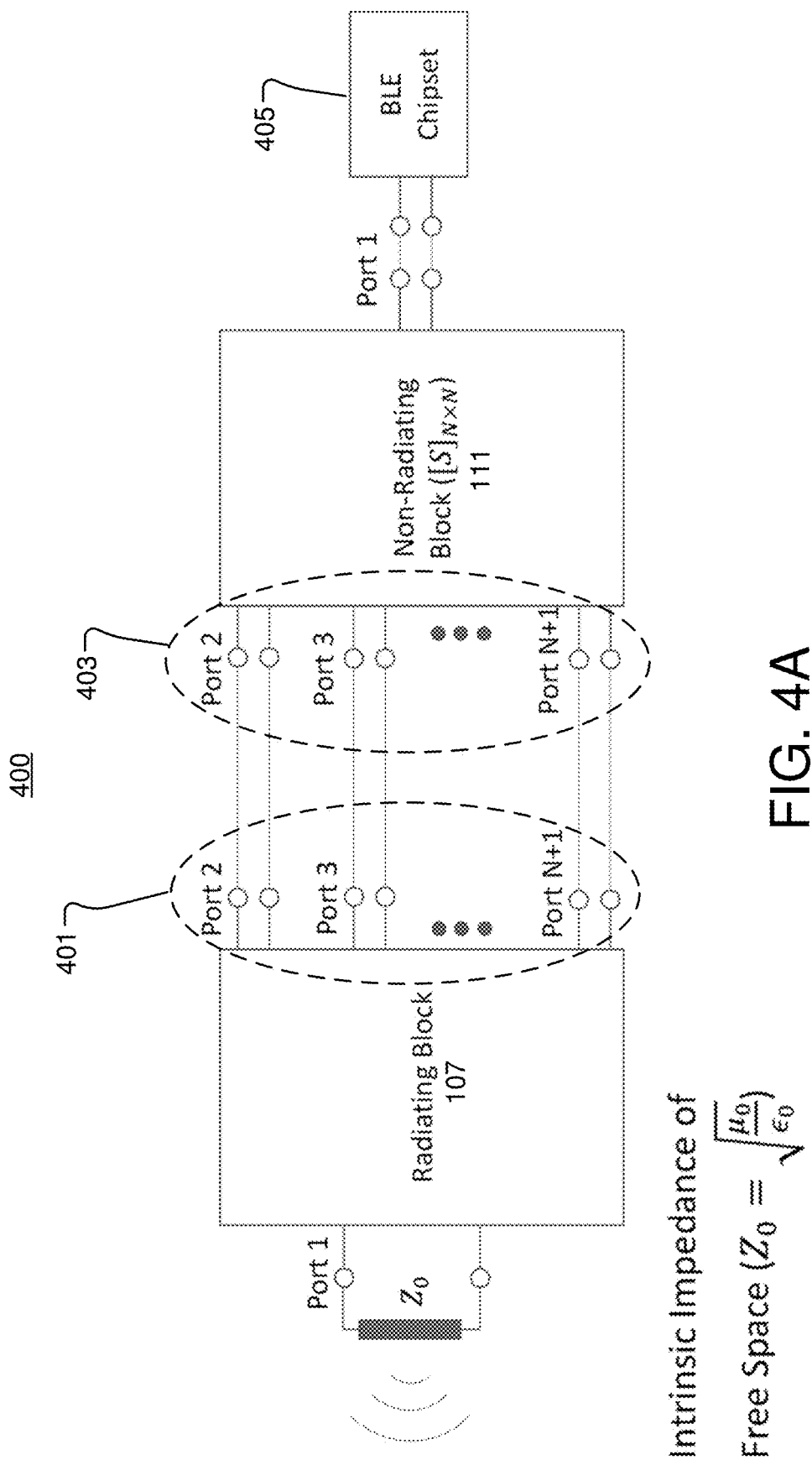
FIGS. 4A to 4B illustrate a connection structure of a radiating block and a non-radiating block of a transceiver according to an embodiment.

FIG. 4A illustrates one embodiment of a connection structure 400 of the radiating block 107 and the non-radiating block 111. The non-radiating block 111 includes a plurality of first ports 403 including ports 1 to port N+1 and the radiating block 107 includes a plurality of second ports 401 including ports 1 to port N. As shown in FIG. 4A, port 1 of the radiating block is connected to port 2 of the non-radiating block 111, port 2 of the radiating block 107 is connected to port 3 of the non-radiating block 111, and port N of the radiating block 107 is connected to port N+1 of the non-radiating block 111. Port 1 of the non-radiating block 111 is connected to a radio 405 (e.g., a BLE (Bluetooth Low Energy) chipset).

Figure 4B:
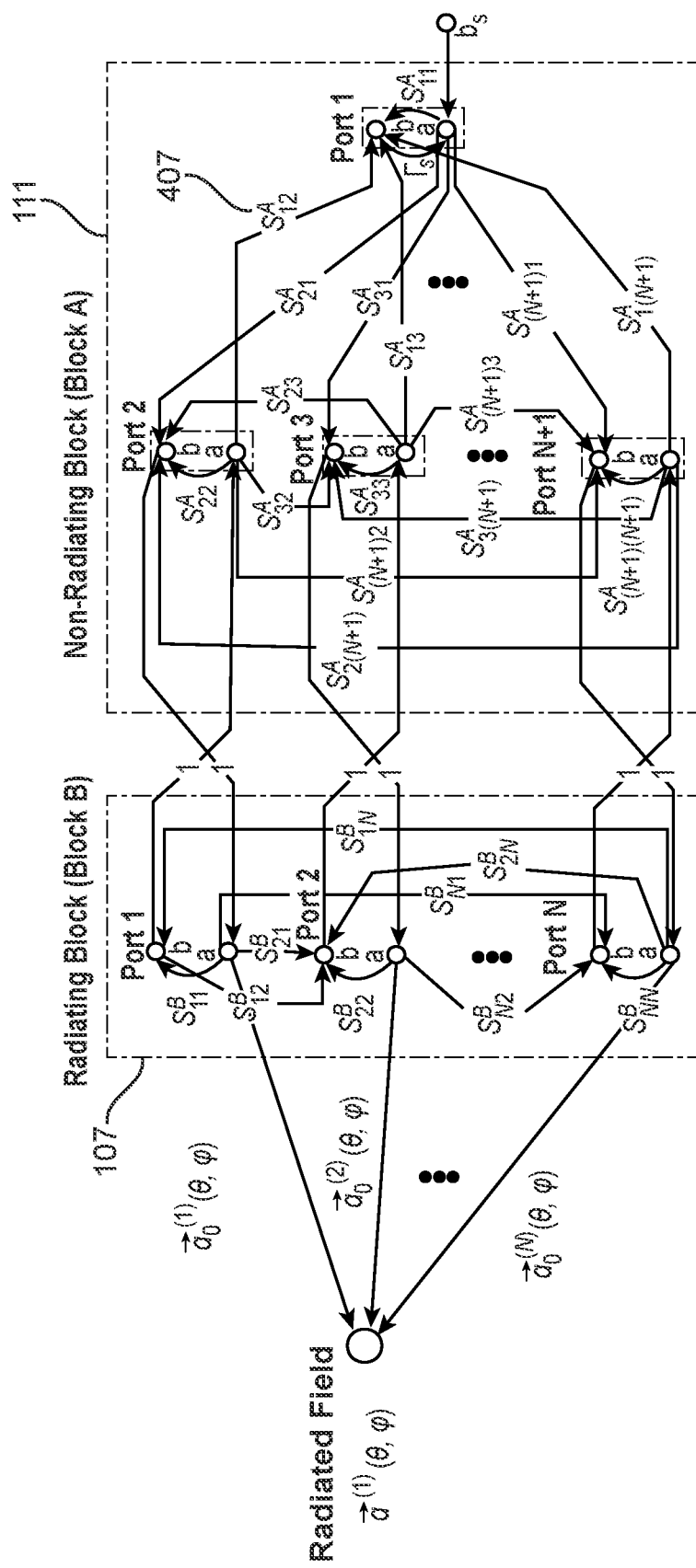

FIG. 4B illustrates one embodiment of a flow-graph of the connection structure 400 of the radiating block 107 and the non-radiating block 111 shown in FIG. 4A. FIG. 4B illustrates the scattering parameters for the non-radiating components between the first ports of the non-radiating block 111 such as scattering parameter 407. Each second port 401 included in the radiating block 107 and each first port 403 included in the non-radiating block 111 is modeled by a respective incident power wave "a" and a reflect wave "b". As shown in FIG. 4B, each port includes a scattering parameter associated with the incident power wave "a" and the reflect wave "b" of the port. In one embodiment, the final device model for the j-th elements in terms of the activation radiation patterns in vector form is shown in equation E11 shown below.

$$\vec{a}^{(j)}(\theta, \varphi, f) = \sum_{i=1}^{N} \alpha_i^{(j)} \vec{a}_0^{(i)}(\theta, \varphi, f) \quad \text{(E11)}$$

In equation E11, the active radiation patterns in the global coordinate system $a_0^{(i)}$ was previously solved for where $\vec{a}_0^{(i)}(\theta, \varphi, f) = a_\theta^{(i)}(\theta, \varphi, f)\hat{\theta} + a_\varphi^{(i)}(\theta, \varphi, f)\hat{\varphi}$. The combining module 211 solves for $\alpha_i^{(j)}$ using the final Mason's rule shown in equation E12 below. Note that $\alpha_i^{(j)}$ is dependent on the network connection between the different ports of the radiating block 107 and the non-radiating block 111 as well as what switches and/or other components of the non-radiating block 111 are enabled. Thus, $\alpha_i^{(j)}$ may change depending on the network connection between the different ports of the radiating block 107 and the non-radiating block 111.

$$\vec{a}^{(j)}(\theta, \varphi, f) = \frac{P_1\left[1 - \sum \mathcal{T}(1)^{(1)} + \sum \mathcal{T}(2)^{(1)} - \ldots\right] + \frac{P_2\left[1 - \sum \mathcal{T}(1)^{(2)} + \ldots\right] + \ldots}{1 - \sum \mathcal{T}(1) + \sum \mathcal{T}(2) - \sum \mathcal{T}(3) + \ldots}}{} = \sum_{i=1}^{N} \alpha_i^{(j)} \vec{a}_0^{(i)}(\theta, \varphi, f) \quad \text{(E12)}$$

In equation E12, each $P_i$ denotes a path which can be followed from the independent variable node to the node whose value is being determined. In one embodiment a path is a series of directed lines allowed in sequence and in the same direction in such a way that no node is touched more than once. The value of the path is the product of all coefficients encountered in the process of traversing the path.

Furthermore, in equation E12, $\Sigma \mathcal{T}$ (1) denotes a sum over all first order loops. A first order loop is a series of directed lines coming to a closure when followed in sequence and in the same direction with no node passed more than once. The value of the loop is the product of all coefficients encountered in the process of traversing the loop.

In equation E12, $\Sigma \mathcal{T}$ (2) denotes the sum over all second order loops. A second order loop is the product of any two first order loops which do not touch at any point. Similarly, $\Sigma \mathcal{T}$ (n) denotes the sum over all n order loops. A n order loop is the product of any n first order loops which do not touch at any point.

In equation E12, $\Sigma \mathcal{T}$ $(1)^{(1)}$ denotes the sum of all the first order loops which do not touch $P_1$ at any point. Lastly, $\Sigma \mathcal{T}$ $(2)^{(1)}$ denotes the sum of all the second order loops which do not touch $P_1$ at any point.

The combining module 211 obtains $\alpha_i^{(j)}$ after the application of Mason's rules in equation E12 described above thereby completing the device model of a given transceiver 105 represented by equation E11. The device model for the given transceiver 105 represented by equation E11 describes the expected RF response of the transceiver 105 to an incoming signal from any direction in three-dimensional space. More specifically, the device model of a given transceiver 105 is a representation of the signal path through the non-radiating components of the non-radiating block 111A of the given transceiver 105, one or more ports of the non-radiating block 111A of the given transceiver 105, one or more ports of the radiating block 107A that are connected to the one or more ports of the non-radiating block 111A of the given transceiver 105, and a RF sensor(s) 109 (e.g., an antenna) of the radiating block 107A of the given transceiver 105.

As mentioned previously, the device model of a given transceiver 105 is a matrix or set of data entries where each data entry in the matrix is associated with a particular RF path in the transceiver using a particular RF sensor 109 for a given $\theta$ and $\varphi$. The matrix includes for each RF path of the transceiver entries for all possible combinations of $\theta$ and $\varphi$ in order to model all the possible RF responses for the RF path. The discretization of the angles $\theta$, $\varphi$ in n steps defines the minimum resolution of the estimation. In one embodiment, the angle in $\theta$ is discretized in 180 steps and $\varphi$ is discretized in 360 steps achieves 1-degree angular resolution in three-dimensional space. In one embodiment, interpolation techniques may further be used to increase the angular resolution. The matrix of data entries is saved as the device model 127 for storage in the device model storage 115 of the transceiver being modeled according to the first embodiment of FIG. 1A or is stored as a device model 133 in the device model storage 131 shared by all transceivers 105A to 105N in the second embodiment of FIG. 1B.

In one embodiment, the combining module 211 applies a curve fitting algorithm to the matrix of data entries. For example, a regression model is applied to the matrix of data entries. As a result, the combining module 211 generates a mathematical equation in terms of $\theta$ and $\varphi$ that is a best fit for the data in the matrix of data entries. Rather than store the matrix of data entries, the combining module 211 may store the mathematical equation that represents the matrix of data entries. By storing the mathematical equation, the amount of memory required by the device model storages 115A to 115N in the first embodiment of FIG. 1A and the device model storage 131 in the second embodiment of FIG. 1B is reduced at the expense of requiring more CPU performance to calculate the estimated response of the transceiver 105 using the mathematical equation.

As mentioned previously, the device model of a given transceiver 105 is used to interpret an incoming RF signal as a signal response vector that can be used to estimate location attributes of the transceiver that transmitted the RF signal. For example, an incoming wireless signal received from a top left side of the transceiver 105 relative to a center of the transceiver 105 presents a different RF response from the device model compared to another incoming signal received from a bottom right side of the transceiver relative to the center of the transceiver, for example.

The estimation module 203 of a receiving transceiver 105 (e.g., transceiver 105A) estimates location attributes of another transceiver 105 (e.g., transceiver 105B) that transmits a RF signal received by the given transceiver. In one embodiment, the estimated location attributes of the transmitting receiver describe a location of the transmitting transceiver. The estimated location attributes for the transmitting transceiver system 105B include the location of the transmitting transceiver system 105B 105 with respect to a global coordinate system and an estimated angle (e.g., azimuthal φ, and elevation θ) of the transmitting transceiver in one embodiment.

The estimated location attributes may also include relative location attributes between the receiving transceiver system 105B 105A and the transmitting transceiver system 105B. The estimated location attributes may include an estimated angle (e.g., azimuthal φ, and elevation θ) between the receiving transceiver system 101A and the transmitting transceiver system 101B. The estimated location attributes may also include an estimated distance between the receiving transceiver system 101A and the transmitting transceiver system 10B and an estimated time of travel of the wireless signal between the receiving transceiver system 101A and transmitting transceiver system 101B. The estimated location attributes may include other location information as well as those described herein.

In one embodiment, the estimation module 203 estimates location attributes of a transmitting transceiver by correlating an incoming RF signal received by the receiving transceiver to the device model of the receiving transceiver. That is, the estimation module 203 compares the incoming RF signal to entries of the device model of the receiving transceiver to identify an entry that best matches (e.g., correlates) with the incoming RF signal. As mentioned above, each entry in the device model is associated with a particular polarization θ, φ. The polarization θ, φ of the entry that best matches magnitude of the incoming RF signal corresponds to the angle of arrival of the incoming RF signal in terms of θ, φ. The angle of arrival can be used by the estimation module 203 to calculate other location attributes such as the position of the transmitter as described in the use case example below.

Use Case Example

Figure 5A:
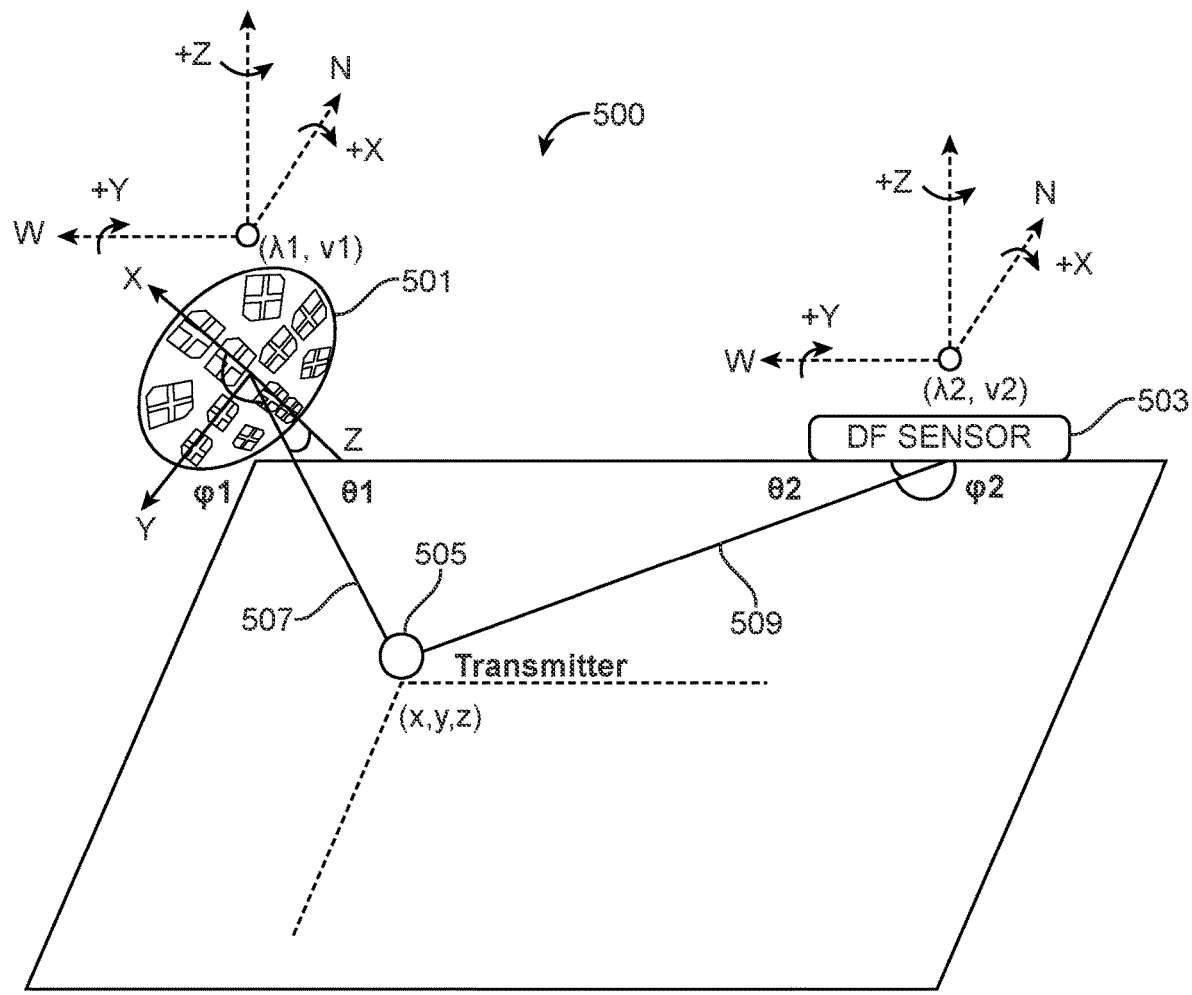
FIG. 5A illustrates a location tracking environment that uses a plurality of receiving transceivers to estimate location attributes of a transmitting transceiver operating according to an embodiment.

FIG. 5A illustrates a location tracking environment 500 that uses a plurality of receiving transceivers to estimate location attributes of a transmitting transceiver according to an embodiment. In the example, shown in FIG. 5A, two receiving transceivers 501 and 503 are used to estimate the location attributes of the transmitting transceiver 505. The two receiving transceivers 501 and 503 are positioned at known locations and the device model of each receiving transceiver 501 and 503 is also known. For example, the receiving transceivers 501 and 503 are placed on the ceiling of a building while the transmitting transceiver 505 is placed on a moving object just as a person or a machine.

In one embodiment, each receiving transceiver 501 and 503 receives an incoming RF signal from the transmitting transceiver 505. For example, receiving transceiver 501 receives incoming wireless signal 507 at polarizations θ1 and φ1 that are unknown. Similarly, receiving transceiver 503 receives incoming RF signal 509 at polarizations θ2 and φ2 that are unknown.

As mentioned above, the generic device model of each of the unique RF paths of the receiving transceivers 501 and 503 is represented by equation E11 previously described above, but reproduced below for explanation purposes.

$$\vec{a}^{(j)}(\theta, \varphi, f) = \sum_{i=1}^{N} \alpha_i^{(j)} \vec{a}_0^{(i)}(\theta, \varphi, f) \tag{E11}$$

Assuming each receiving transceiver 501 and 503 includes three RF sensors 109(1), 109(2), and 109(3), each receiving transceiver 501 and 503 provides three unique RF paths for the incoming RF signal. Note that each transceiver 501 and 503 may include any number of RF sensors 109 other than three which is used merely for explanation purposes. The response vectors for the three unique RF paths for a defined polarization θ can be described as follows with respect to equation E11.

$$\begin{pmatrix} \vec{a}_\theta^{(1)}(\theta, \varphi) \\ \vec{a}_\theta^{(2)}(\theta, \varphi) \\ \vec{a}_\theta^{(3)}(\theta, \varphi) \end{pmatrix}$$

Figure 5B:
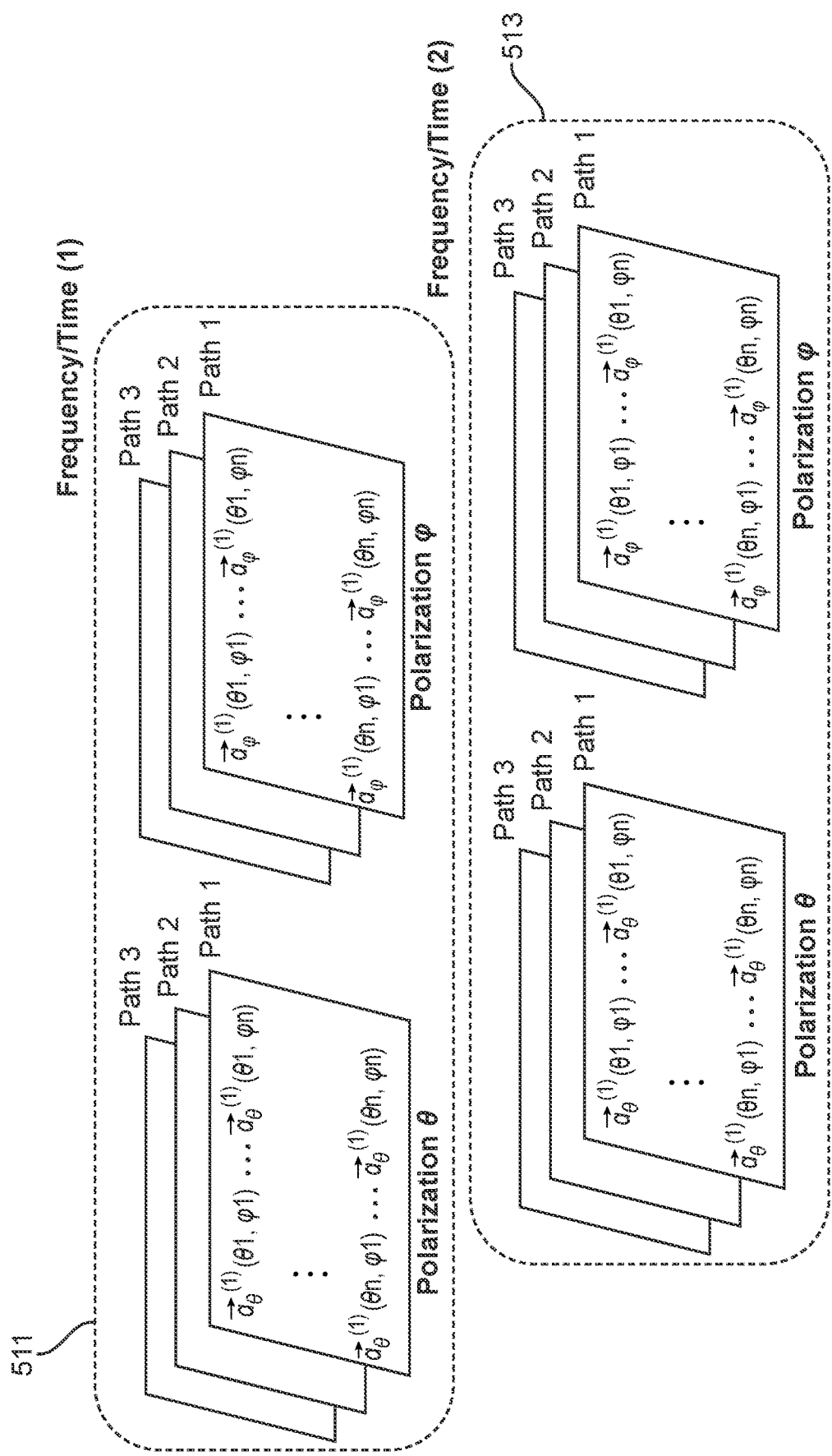
FIG. 5B illustrates a device model of a transceiver according to an embodiment.

The unique response of each RF sensor 109 included in the receiving transceivers 501 and 503 is a function of both the elevation angle θ and the azimuth angle φ and is stored in the device model of the receiving transceivers 501. At a given frequency and time, the three unique RF paths is shown in FIG. 5B. Device model 511 is a representation of the RF signal paths 1 to 3 of the RF sensors included in a given receiving transceiver 501 or 503 at frequency/time (1) at different angles θ, φ and device model 513 is a representation of the RF signal paths 1 to 3 of the RF sensors included in the given receiving transceiver 501 or 503 at frequency/time (2) at different angles θ, φ.

In one embodiment, the respective estimation module 203 of the receiving transceivers 501 and 503 estimates the direction of arrival of its incoming signal 507, 509 in terms of θ and φ. That is, estimation module 203 of receiving transceiver 501 estimates θ1 and φ1 according to the device model of the receiving transceiver 501 and the estimation module 203 of receiving transceiver 503 estimates θ2 and φ2 according to the device model of the receiving transceiver 503. In one embodiment, each of θ1 and θ2 can be considered an incident angle $\theta_{inc}$ and each of φ1 and φ2 can be considered an incident angle $\varphi_{inc}$. Under this assumption, at a given time t that the incoming RF signal arrives at its respective receiving transceiver 501 or 503, the incoming signal x(t) is represented by equation E13 shown below.

$$x(t) = ae^{bj} A(\theta_{inc}, \varphi_{inc}) \tag{E13}$$

where A is the actual vector response model of the unique RF paths.

In one embodiment, each estimation module 203 correlates the incoming RF signal to an entry in the device model to identify the entry in the device model that best matches the incoming wireless signal. The correlation $P_{corr}$ of the incoming signal to the stored generic device model for each of receiving transceivers 501 and 503 is represented by equation E14 shown below.

$$P_{corr}(\theta,\varphi) = A^H x(t) \quad \text{(E14)}$$

where $P_{corr}$ is a non-adaptive estimate of the spectrum of the incoming signal data and $A^H$ is the largest peak in the spectrum which is the estimated direction of arrival because $A^H(\theta, \varphi)A(\theta_{inc}, \varphi_{inc})$ has a maximum at $(\theta, \varphi)=\theta_{inc}, \varphi_{inc}$.

Knowing θ1 and φ1 of incoming wireless signal 507 and θ2 and φ2 of incoming wireless signal 509, the location of the transmitting transceiver 505 may be identified since two unique lines represented by the incoming wireless signals 507 and 509 intersect at a single point in space which corresponds to the location of the transmitting transceiver 505. In one embodiment, the estimation module 203 of each receiving transceiver 501, 503 works in conjunction with its respective coordinate conversion module 209 to convert the location of the receiving transceiver 501, 503 from its local coordinate system to the global coordinate system. Since the global coordinate system location of each receiving transceiver 501, 503 is known and the angles of the incoming wireless signals 507 and 509 are known, the location of the transmitting transceiver 505 in the global coordinate system is calculated.

Figure 5C:
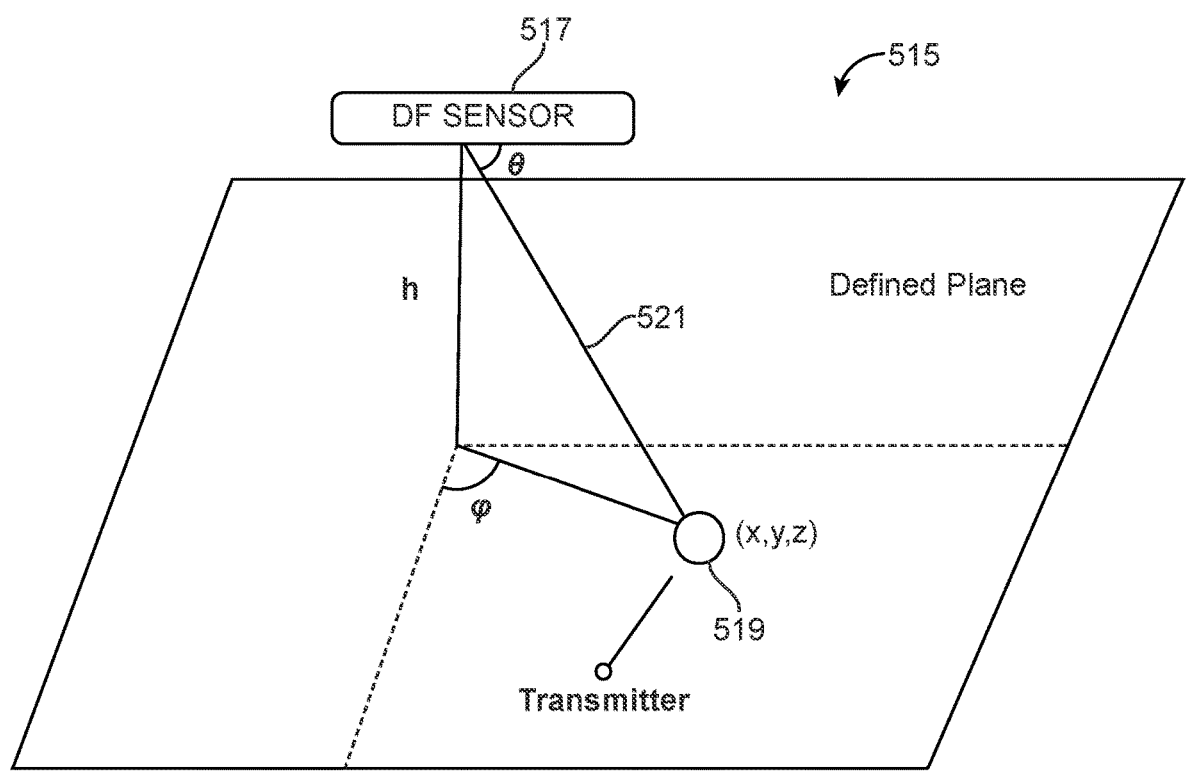
FIG. 5C illustrates a location tracking environment that uses one receiving transceiver to estimate location attributes of a transmitting transceiver according to an embodiment.

In the example environment shown in FIG. 5A, two receiving transceivers 501 and 503 are used to estimate the location attributes of the transmitting transceivers 505. In one embodiment, a location tracking environment 515 may include a single receiving transceiver 517 that receives an incoming wireless signal 521 having incoming angles θ, φ from transmitting transceiver 519 as shown in FIG. 5C. In order for the estimation module 203 of the single receiving transmitter 517 to determine the location attributes of the transmitting transceiver 519, the estimation module 203 assumes a value for height h of the transmitter 519 in one embodiment. Depending on the context of application, the transmitting transceiver 519 is always positioned within a particular height range such as roughly 6 feet high from ground assuming the transmitting transceiver 519 is placed on the head of a person. With the known value, the estimation module 203 of the receiving transceiver 517 may estimate the angles of the incoming wireless signal θ, φ by correlating the incoming wireless signal 521 with the stored device model of the receiving transceiver 517 as described above.

Method Flow Diagrams

Figure 6:
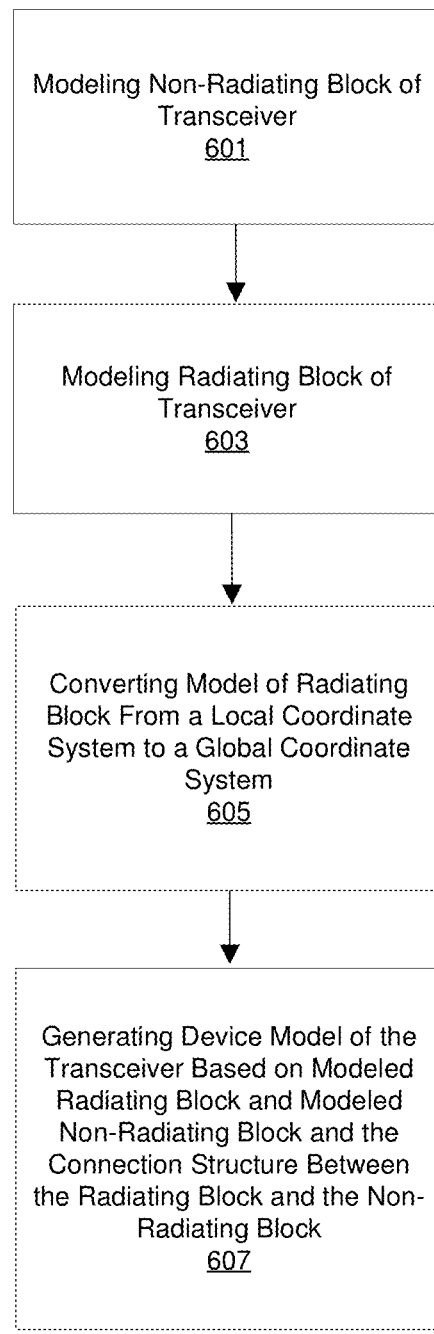
FIG. 6 illustrates a method flow diagram describing a process of generating a device model of a transceiver according to an embodiment.

FIG. 6 illustrates a method flow diagram describing a process of generating a device model of a transceiver according to an embodiment. Note in other embodiments, other steps may be shown than those illustrated in FIG. 6.

In one embodiment, a transceiver system 101 models 601 a non-radiating block of a transceiver 105 that is included in the transceiver system 101. The non-radiating block 111 of the transceiver 105 includes non-radiating components of the non-radiating block 111A such as RF switches, ports, transmission lines, and RF components such as a balun, attenuator, RF hybrid couplers, or resistor-inductor-capacitor (RLC) components. The non-radiating block 111 of the transceiver 105 may also include other non-radiating components such as Low Noise Amplifiers (LNA), Power Amplifiers (PA), multiplexers, phase shifters, tunable delay lines or any other active or passive RF components in the RF path that can be modeled by scattering parameters.

The transceiver system 101 models 603 the radiating block 107 of the transceiver 105. The radiating block 107 is configured to radiate or receive RF signals and includes one or more RF sensors 109. The RF sensors 109 may be arranged in an antenna array. In one embodiment, the model of the radiating block 107 includes a first portion based on scattering parameters of the radiating components of the radiating block 107. The model of the radiating block 107 also includes a second portion based on radiation patterns of the RF sensors 109 included in the radiating block 107.

In one embodiment, the second portion of the model of the radiating block is in the local coordinate system of the transceiver 105 being modeled. The transceiver system 101 converts 605 the second portion of the model of the radiating block that is in the local coordinate system to a global coordinate system. An example of the global coordinate system is the ECI reference frame.

The transceiver system 101 generates 607 the device model of the transceiver 105 based on the modeled radiating block and the modeled non-radiating block. In one embodiment, the model of the radiating block 107 and the model of the non-radiating block 111 are combined with consideration of the connection structure between the radiating block 108 and the non-radiating block 111, to form the general device model of the transceiver 105. Thus, the model of the transceiver 105 is generated based on a combination of combination of the model of the radiating block, the model of the non-radiating block, and RF transmission characteristics of a path of a RF signal between the radiating block and the non-radiating block of the transceiver 105 where the device model is representative of at least the path of the RF signal through non-radiating components of the radiating block, one or more first ports of the non-radiating block of the transceiver 105, one or more second ports of the radiating block the transceiver 105, and an RF sensor (e.g., an antenna) included in the radiating block. The general device model of the transceiver 105 is stored in the transceiver system 101. In one embodiment, the general device model of the transceiver 105 may be a data matrix that includes a plurality of data entries where each entry describes a RF response in terms of a magnitude of power and a phase of the power in response to a RF signal at specific polarizations θ and φ. Alternatively, the general device model is an equation that represents the data included in the data matrix.

Figure 7:
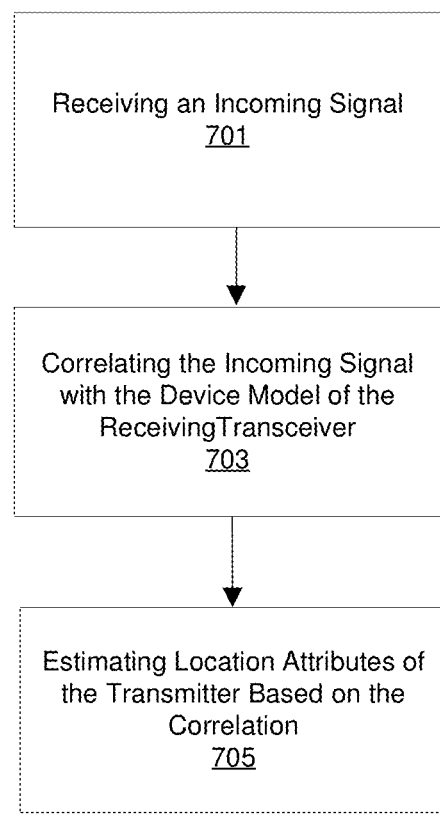
FIG. 7 illustrates a method flow diagram describing a process of estimating location attributes of a transceiver according to an embodiment.

FIG. 7 illustrates a method flow diagram describing a process of estimating location attributes of a transceiver according to an embodiment. Note in other embodiments, other steps may be shown than those illustrated in FIG. 7.

In one embodiment, a first transceiver (e.g., a receiver) of a transceiver system receives 707 an incoming RF signal from a second transceiver (e.g., a transmitter). The incoming RF signal is received at incoming angles θ and φ that are unknown. The angles of the incoming RF signal are examples of location attributes of the second transceiver.

To determine the incoming angles, the transceiver system correlates 703 the incoming RF signal with the device model of the first transceiver. In one embodiment, the incoming RF signal is correlated with the device model by comparing the incoming RF signal with the device model of the first transceiver.

The transceiver system 703 estimates 705 location attributes of the transmitter based on the correlation. That is, an entry in the device model that best matches the incoming signal is identified. As mentioned above, each entry in the device model describes a RF response in terms of a magnitude of power and a phase of the power in response to a RF signal at specific polarizations θ and φ. The pair of angles associated with the matching entry represent the incoming angles of the incoming signal. The location of the second transceiver may also be calculated based on the known location of the first transceiver and the angles θ and φ of the incoming RF signal. Note that in other embodiments other signal processing techniques/algorithms may be used to estimate the location attributes of the transmitter. For example, other algorithms that may be used to estimate the location attributes of the transmitter include spectral estimation, Capon Beamforming, phase interferometer techniques, multiple signal classification (MUSIC) algorithms, estimation of signal parameters via rational invariance techniques (ESPRIT) algorithms, space-alternating generalized expectation-maximization (SAGE) algorithm, PDA algorithms, Pseudo Doppler, and maximum likelihood estimators.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of a first transceiver system for estimating location attributes of a second transceiver system, the method comprising:
receiving, by the first transceiver system, an incoming radio frequency (RF) signal transmitted from the second transceiver system;
comparing the incoming RF signal to a device model of the first transceiver system; and
estimating the location attributes of the second transceiver system that include a first incoming angle and a second incoming angle of the incoming RF signal in a spherical coordinate system based on the comparison,
wherein the device model of the first transceiver system comprises a combination of a first model of a first portion of the first transceiver system that includes non-radiating components of the first transceiver system that do not radiate a RF signal of the first transceiver system, a second model of a second portion of the first transceiver system that includes an antenna configured to radiate the RF signal, and RF transmission characteristics of a path of the RF signal between the first portion and the second portion of the first transceiver system, the device model representative of at least the path of the RF signal through the non-radiating components, one or more first ports of the first portion of the first transceiver system, one or more second ports of the second portion of the first transceiver system, and the antenna.

2. The method of claim 1, wherein the device model includes a plurality of data entries, each of the plurality of data entries representative of a different path of the RF signal through the non-radiating components, the one or more first ports of the first portion of the first transceiver system, the one or more second ports of the second portion of the first transceiver system, and the antenna at a corresponding polarization θ and a corresponding polarization φ that are unique to the data entry, and wherein comparing the incoming RF signal to the device model comprises:
comparing the incoming RF signal to the plurality of data entries to identify a matching entry in the device model,
wherein the polarization θ and the polarization φ corresponding to the matching entry represent the first incoming angle and the second incoming angle of the incoming RF signal.

3. The method of claim 2, further comprising:
determining a first location of the first transceiver system in a local coordinate system;

converting the first location in the local coordinate system to a second location of the first transceiver system in a global coordinate system; and estimating a location of the second transceiver system in the global coordinate system based on the second location of the first transceiver system and the polarization θ and the polarization φ of the incoming RF signal.

4. The method of claim 1, further comprising:
receiving the device model of the first transceiver system from a third-party source that is different from a manufacturer of the first transceiver system.

5. The method of claim 1, wherein the first transceiver system is pre-configured with the device model of the first transceiver system by a manufacturer of the first transceiver system.

6. A first transceiver system comprising:
a first portion of the first transceiver system that includes an antenna, the antenna configured to receive an incoming radio frequency (RF) signal transmitted from a second transceiver system; and
a controller configured to compare the incoming RF signal to a device model of the first transceiver system and estimate location attributes of the second transceiver system that include a first incoming angle and a second incoming angle of the incoming RF signal in a spherical coordinate system based on the comparison, wherein the device model of the first transceiver system comprises a combination of a first model of the first portion of the first transceiver system, a second model of a second portion of the first transceiver system that includes non-radiating components of the first transceiver system that do not radiate a RF signal of the first transceiver system, and RF transmission characteristics of a path of the RF signal between the first portion and the second portion of the first transceiver system, the device model representative of at least the path of the RF signal through the non-radiating components, one or more first ports of the first portion of the first transceiver system, one or more second ports of the second portion of the first transceiver system, and the antenna.

\* \* \* \* \*